US010264237B2

(12) United States Patent
Omori et al.

(10) Patent No.: US 10,264,237 B2
(45) Date of Patent: Apr. 16, 2019

(54) IMAGE PROCESSING DEVICE

(71) Applicant: Sharp Kabushiki Kaisha, Osaka-shi, Osaka (JP)

(72) Inventors: Keisuke Omori, Osaka (JP); Kei Tokui, Osaka (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 278 days.

(21) Appl. No.: 15/033,250

(22) PCT Filed: Nov. 4, 2014

(86) PCT No.: PCT/JP2014/079175
§ 371 (c)(1),
(2) Date: Apr. 29, 2016

(87) PCT Pub. No.: WO2015/072363
PCT Pub. Date: May 21, 2015

(65) Prior Publication Data
US 2016/0247288 A1   Aug. 25, 2016

(30) Foreign Application Priority Data
Nov. 18, 2013   (JP) .................................. 2013-237971

(51) Int. Cl.
G06K 9/62   (2006.01)
H04N 13/257   (2018.01)
(Continued)

(52) U.S. Cl.
CPC ......... *H04N 13/257* (2018.05); *G06K 9/3233* (2013.01); *G06K 9/4671* (2013.01);
(Continued)

(58) Field of Classification Search
CPC .... G06K 9/4671; G06K 9/6202; G06T 7/174; G06T 5/50
See application file for complete search history.

(56) References Cited

U.S. PATENT DOCUMENTS 5,576,827 A * 11/1996 Strickland .......... G01N 15/0211
356/336
2003/0179445 A1 * 9/2003 Maenle .................... G01N 1/30
359/368

(Continued)

FOREIGN PATENT DOCUMENTS

JP    11-185018 A    7/1999
JP    11185018 A  *  7/1999  ............. G06F 15/62
(Continued)

Primary Examiner — Chan S Park
Assistant Examiner — Mai H Tran
(74) Attorney, Agent, or Firm — ScienBiziP, P.C.

(57) ABSTRACT

As to N images captured at different focus positions, which are arrayed in order of focus positions, N/2 images are set as feature point extraction images so that at least one of two adjacent images becomes a feature point extraction image; corresponding points corresponding to a feature point, extracted from the feature point extraction image, are searched for from the other images; a correction parameter, with which corresponding positions of the N images are matched, is calculated from a positional relation of the feature point and the corresponding points; and, with an image whose view angle is the smallest among the N images as a reference, the other images are corrected.

10 Claims, 19 Drawing Sheets

(51) Int. Cl.

| | | |
|---|---|---|
| *H04N 13/204* | (2018.01) | |
| *H04N 1/387* | (2006.01) | |
| *G06K 9/46* | (2006.01) | |
| *G06T 5/50* | (2006.01) | |
| *G06K 9/32* | (2006.01) | |
| *H04N 5/232* | (2006.01) | |
| *H04N 13/00* | (2018.01) | |
| *H04N 13/254* | (2018.01) | |
| *H04N 13/271* | (2018.01) | |

(52) U.S. Cl.
CPC ............. *G06K 9/6202* (2013.01); *G06T 5/50* (2013.01); *H04N 1/3871* (2013.01); *H04N 13/204* (2018.05); *G06T 2207/10012* (2013.01); *G06T 2207/10148* (2013.01); *H04N 5/23229* (2013.01); *H04N 13/254* (2018.05); *H04N 13/271* (2018.05); *H04N 2013/0081* (2013.01)

(56) References Cited

U.S. PATENT DOCUMENTS

| | | | |
|---|---|---|---|
| 2006/0152598 A1* | 7/2006 | Kawarada | H04N 5/23248 348/226.1 |
| 2007/0035628 A1* | 2/2007 | Kanai | H04N 5/2259 348/159 |
| 2007/0172221 A1* | 7/2007 | Moriya | G02B 7/102 396/78 |
| 2008/0008399 A1* | 1/2008 | Marugame | G06T 17/10 382/285 |
| 2008/0259176 A1* | 10/2008 | Tamaru | G03B 13/32 348/222.1 |
| 2012/0188437 A1* | 7/2012 | Okamoto | H04N 5/23212 348/349 |
| 2013/0113984 A1* | 5/2013 | Shimamoto | G03B 13/32 348/345 |
| 2013/0335606 A1* | 12/2013 | Aoki | G02B 7/34 348/296 |
| 2014/0118570 A1* | 5/2014 | Chehade | G06K 9/4671 348/222.1 |
| 2016/0191784 A1* | 6/2016 | Murayama | G02B 27/0075 348/347 |
| 2016/0247288 A1* | 8/2016 | Omori | G06K 9/3233 |

FOREIGN PATENT DOCUMENTS

| | | | | |
|---|---|---|---|---|
| JP | 2008-271240 A | | 11/2008 | |
| JP | 2008271240 A | * | 11/2008 | ............. G03B 13/32 |

* cited by examiner

FIG. 1A
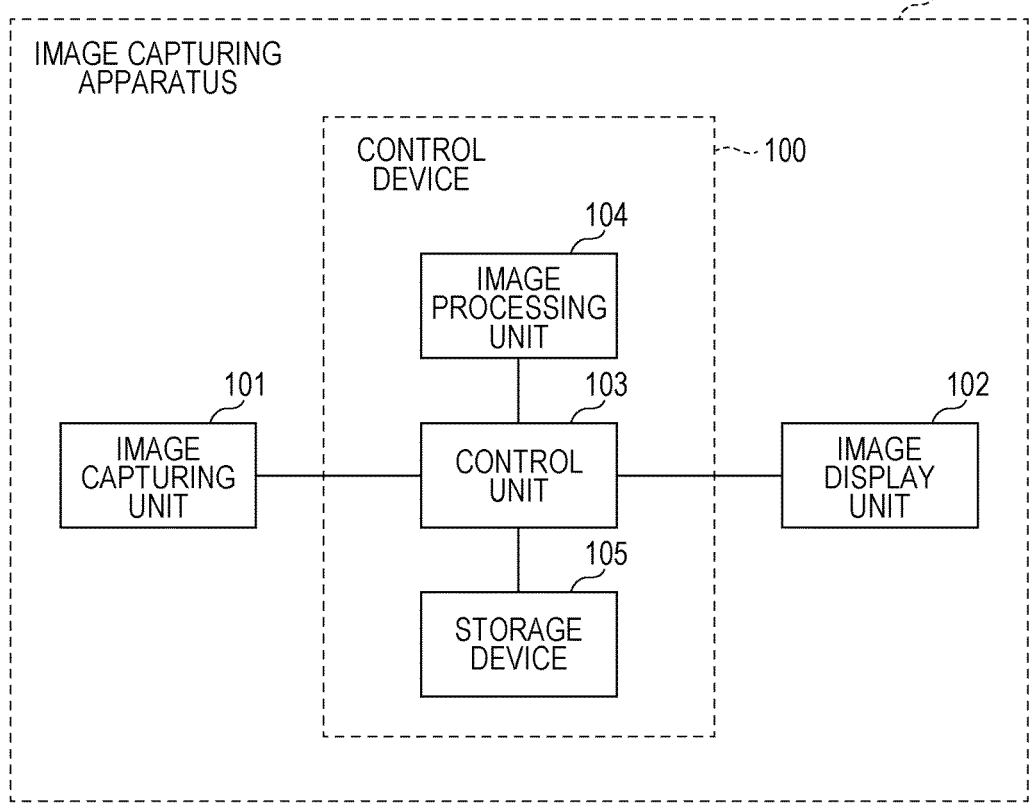
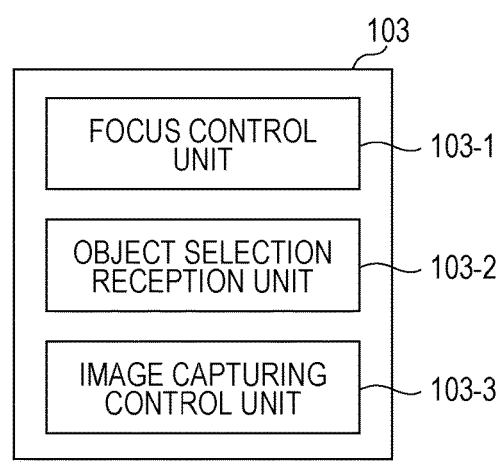

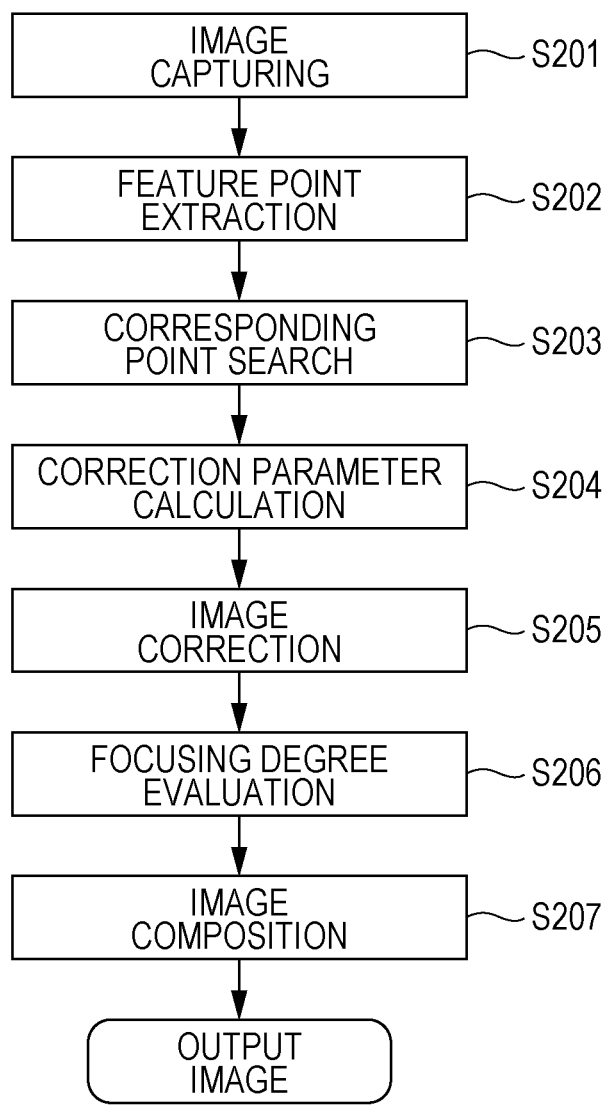

FIG. 3
(A) 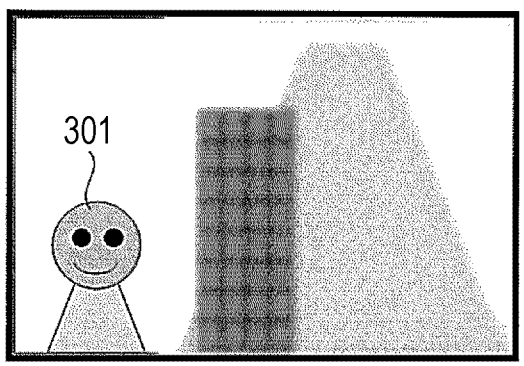
(B) 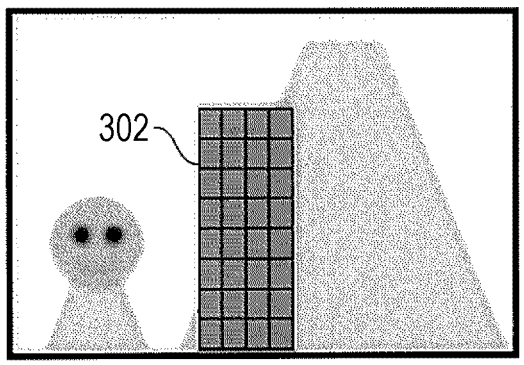
(C) 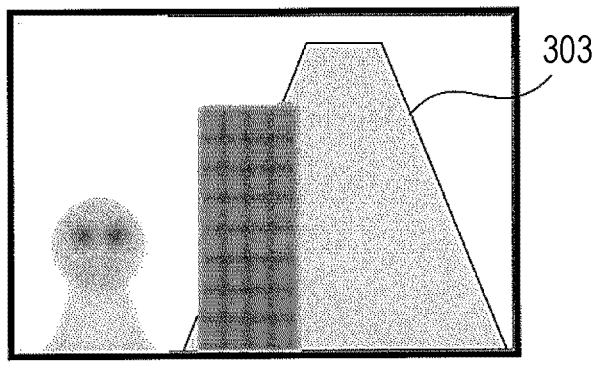

FIG. 4
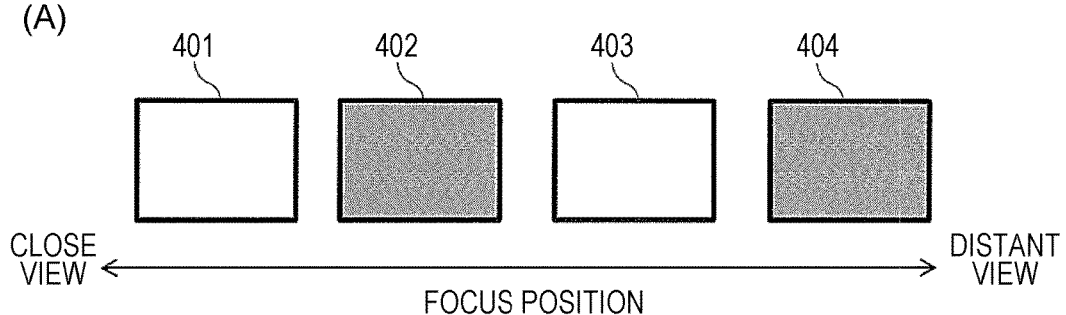
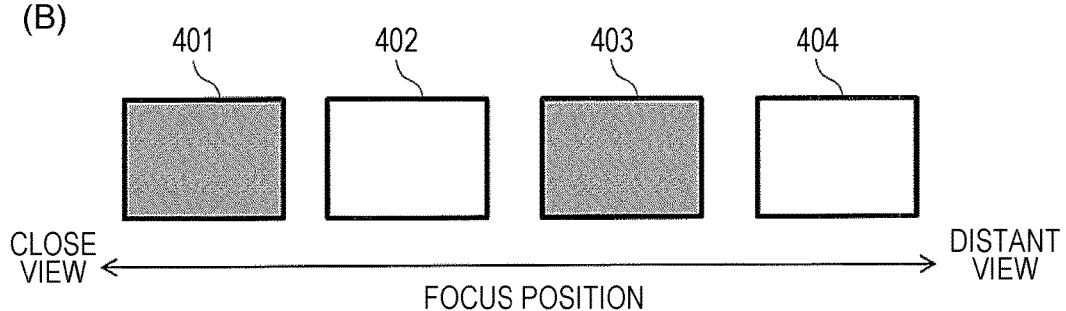
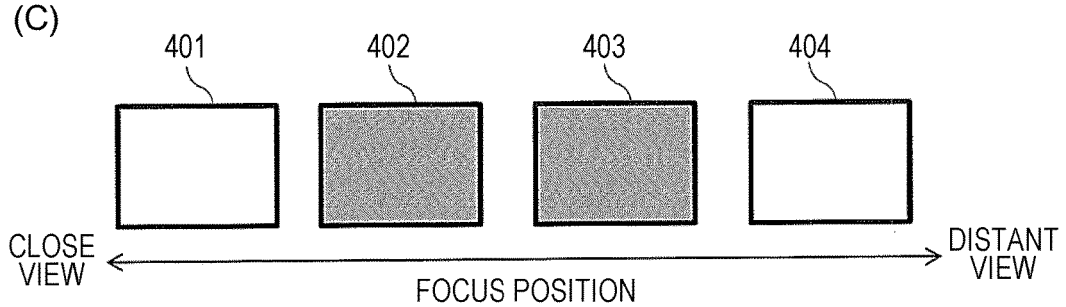

FIG. 5
(A)
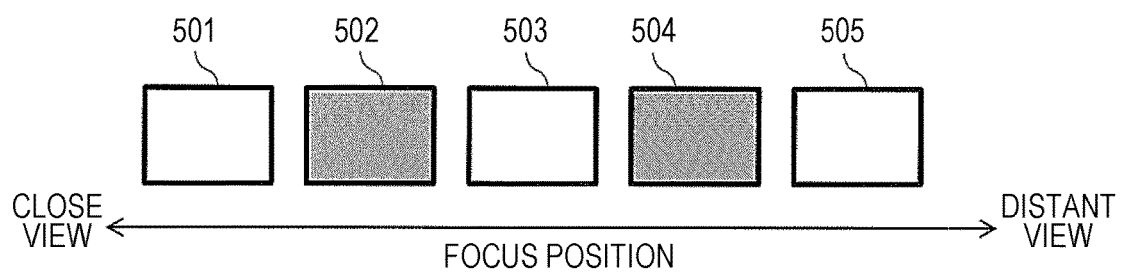
(B)
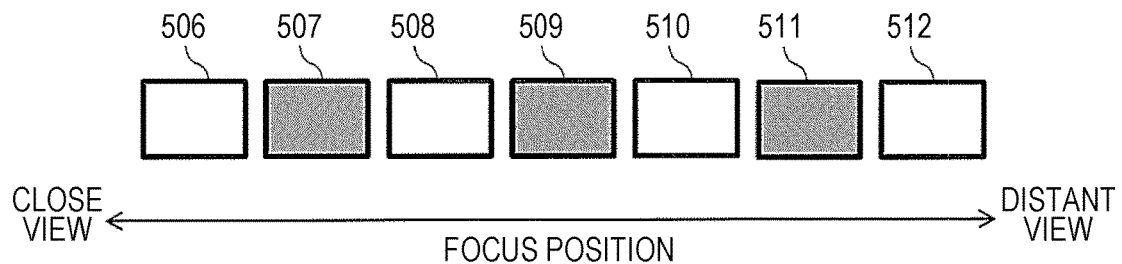

FIG. 6
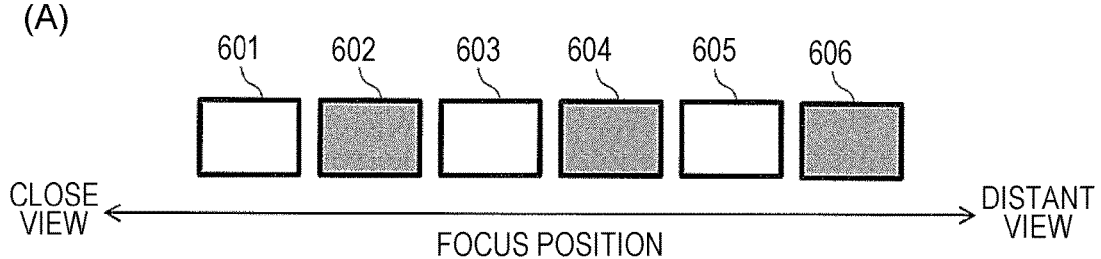
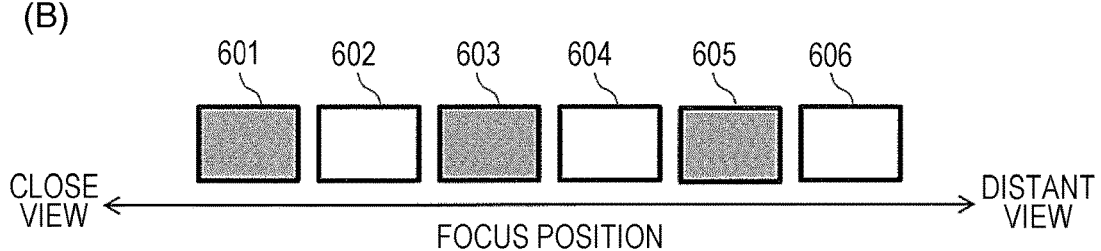
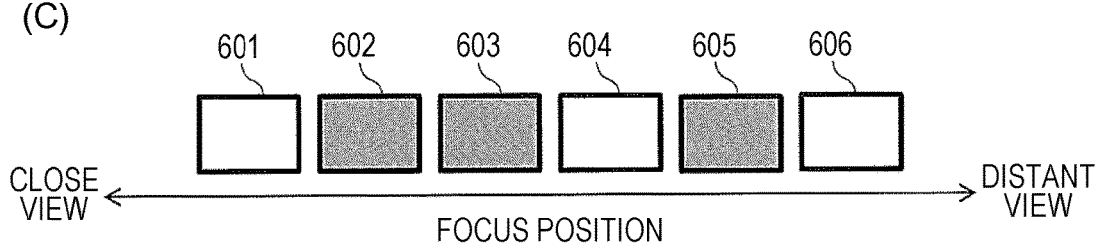
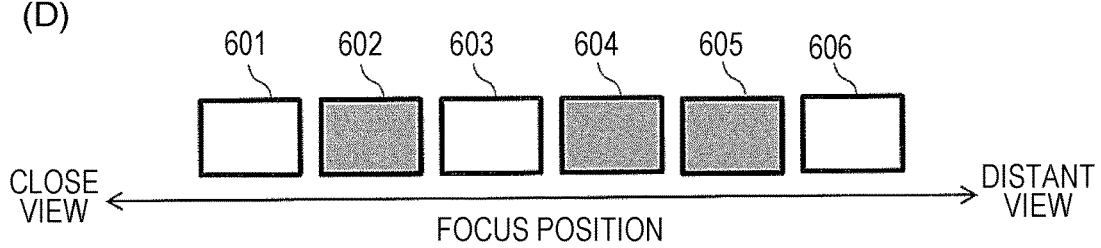

FIG. 16
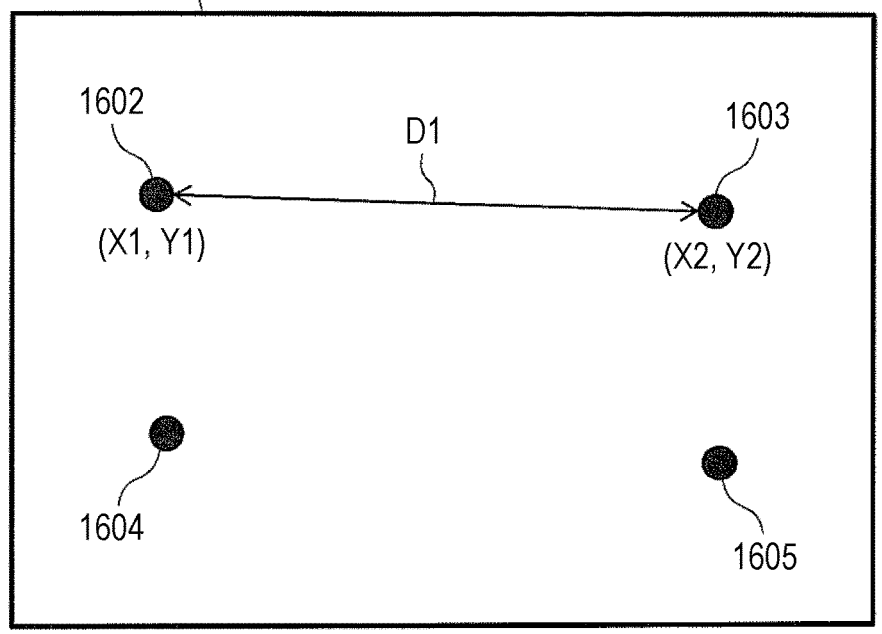
(A) FEATURE POINT EXTRACTION IMAGE 1601
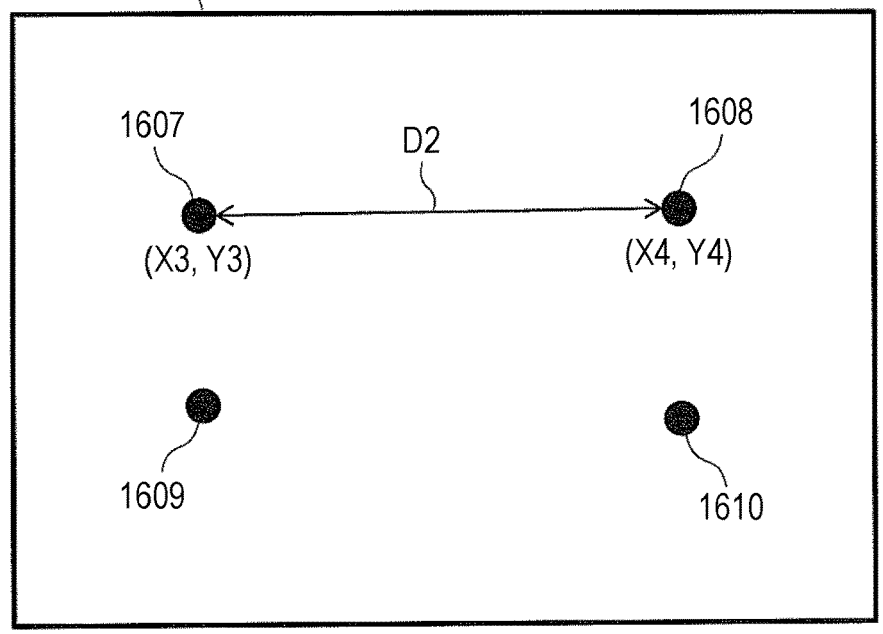
(B) CORRESPONDING POINT EXTRACTION IMAGE 1606

FIG. 22
(A) 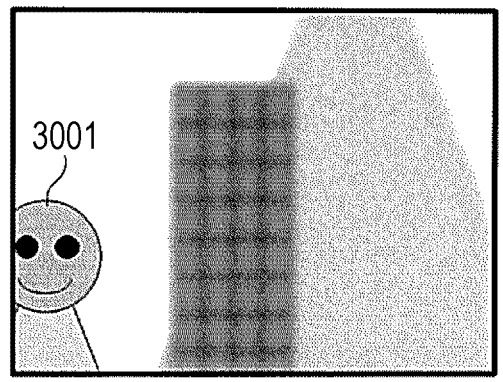
(B) 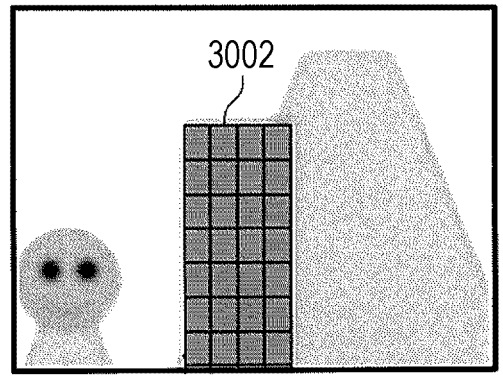
(C) 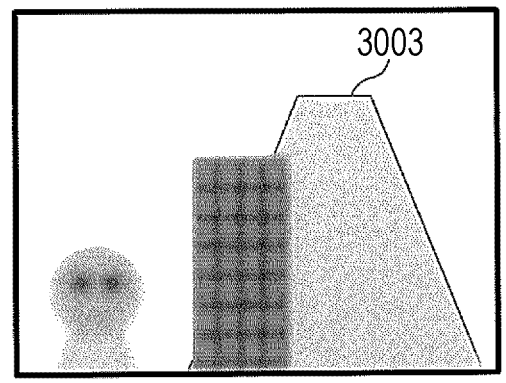

IMAGE PROCESSING DEVICE

TECHNICAL FIELD

The present invention relates to an image processing device in an image capturing apparatus capable of taking an image with a deep depth of field.

BACKGROUND ART

As a technique of obtaining an image with a deep depth of field which is a distance in a depth direction, at which an object is in focus, a technique of generating an image with a deep depth of field by capturing a plurality of images at different focus positions and selecting, from the plurality of images, images in focus at each position of the images to composite them has been known. When photographing while changing a focus position, a view angle changes according to the change in the focus position and corresponding positions between the plurality of images deviate from each other in some cases. Moreover, since photographing times of the plurality of images are different, deviation which results from a movement of a position of an image capturing apparatus or a movement of an object during photography is caused. Thus, in order to generate an image having no deviation, it is necessary to correct the above-described deviation and match the corresponding positions of the plurality of images with each other and then select images in focus.

As a technique of correcting deviation for composition, PTL 1 describes a technique that one of a plurality of images each of which has a different focus position is selected as a base image, a feature point is extracted from the base image, points corresponding to the feature point of the base image are searched for from the images other than the base image, and the images other than the base image are corrected so that the corresponding points of the images other than the base image match the feature point of the base image. Moreover, PTL 2 describes a technique that, in order to improve accuracy of positional alignment of a plurality of images, a correction amount is calculated by using points, whose positions do not move between the plurality of images, among extracted feature points.

CITATION LIST

Patent Literature

PTL 1: Japanese Unexamined Patent Application Publication No. 2008-271240
PTL 2: Japanese Unexamined Patent Application Publication No. 11-185018

SUMMARY OF INVENTION

Technical Problem

However, an image processing method described in PTL 1 has a following problem. FIG. 22 illustrates three images taken at different focus positions. An object (person) 3001 in a close view is in focus in FIG. 22(A), an object (building) 3002 in a middle view is in focus in FIG. 22(B), and an object (mountain) 3003 in a distant view is in focus in FIG. 22(C). In the method described in PTL 1, in a case where FIG. 22(B) or FIG. 22(C) is set as a base image, since a view angle of FIG. 22(A) is smaller than those of FIGS. 22(B) and (C), when correcting FIG. 22(A) so as to match the base image, edge parts of the image are out of the view angle, so that it is difficult to use FIG. 22(A) for composition. Further, in a case where FIG. 22(A) is set as the base image, though the above-described problem of the view angle is solved, since FIG. 22(A) is an image in which the close view is in focus, and FIG. 22(C) is an image in which the distant view is in focus, blurs are greatly different between the two images, so that it is difficult to search for a point corresponding to a feature point of FIG. 22(A) from FIG. 22(C), resulting in that a possibility of deterioration in accuracy of positional alignment is increased.

In addition, an image processing method described in PTL 2 has a following problem. In a case where a plurality of images which are taken while changing a focus position are composited in order to expand a depth of field, when a view angle changes in accordance with the change in the focus position, if comparing the plurality of images, image capturing is performed with enlargement or reduction in a radial direction with the center of each image as the center, so that points corresponding between the plurality of images are to move except in the center of the images. In PTL 2, points whose positions do not move between the plurality of images are used, so that, in a case where the view angle changes in accordance with the change in the focus position, a point in the center of each of the images is to be used. However, since the point in the center of each of the images is a point whose position does not move according to the change in the view angle in accordance with the change in the focus position or rotation, there is little information on calculation of a correction amount such as translation, rotation, or a magnification of enlargement or reduction compared with a point whose position moves.

Further, the image processing method described in PTL 2 also has a following problem. In PTL 2, dispersion of pixel values in a small region of an image is calculated, and a region in which dispersion is great is extracted as a feature point. However, in the case of using the dispersion, there is a possibility to select a point which is inappropriate for the feature point with which positional alignment is performed. For example, there is a possibility to select a region having much noise and few features, such as a dark part. In addition, there is a possibility to select a region like a repeating pattern. It is difficult to search for a corresponding point in the region having few features, and there are a plurality of points each having a high degree of similarity in the region like a repeating pattern, so that it is not always possible to search for a correct corresponding point in the both cases.

The invention is made in view of the aforementioned points, and an object thereof is to provide an image processing device capable of correcting a plurality of images, which are captured at different focus positions, so that corresponding points of the respective images accurately match with each other, and obtaining an image with a deep depth of field by composition.

Solution to Problem

The present invention is made in order to solve the aforementioned problems, and provides
an image processing device which performs positional alignment of N (N is an integer equal to or more than 3) images captured at different focus positions, including:
a feature point extraction unit which extracts a feature point from the N images;
a corresponding point search unit which searches for corresponding points, which correspond to the feature point, between the N images; and an image correction unit which performs positional alignment between the N images based on a positional relation of the feature point and the corresponding points, in which N/2 images among the N images are set as feature point extraction images from each of which the feature point is extracted, at least one of two adjacent images among the N images in order of focus positions is set as one of the feature point extraction images, and the image correction unit corrects, with an image a view angle of which is smallest among the N images as a reference, the other images.

Another aspect of the invention is the image processing device described above, in which the N/2 feature point extraction images are set from N−2 images obtained by excluding two images of an image captured at a focus position in a closest view side and an image captured at a focus position in a most distant view side from the N images.

Another aspect of the invention is the image processing device described above, in which the feature point extraction unit extracts the feature point from a region excluding edges of the image and a center of the image of the feature point extraction image, and extracts feature points which are respectively close to four corners of the feature point extraction image.

Another aspect of the invention is the image processing device described above, further including an image composition unit which performs composition by selecting or weighted averaging pixels of an image a focusing degree of which is high from the N images which are subjected to the positional alignment by the image correction unit, and thereby obtains an image with a deep depth of field by composition, in which the image composition unit performs composition by excluding an image, accuracy of positional alignment of which is low, based on the positional relation of the feature point and the corresponding points.

Another aspect of the invention is the image processing device described above, further including an image composition unit which performs composition by selecting or weighted averaging pixels of an image a focusing degree of which is high from the N images which are subjected to the positional alignment by the image correction unit, and thereby obtains an image with a deep depth of field by composition, in which in a case where a plurality of images captured at substantially same focus positions are included in the N images, the image composition unit performs composition by excluding at least one of the images captured at substantially the same focus positions.

The present specification includes the content in its entirety described in the specification and/or the drawings of Japanese Patent Application No. 2013-237971 which is the base of the priority of the present application.

Advantageous Effects of Invention

According to the present invention, it is possible to correct a plurality of images, which are captured at different focus positions, so that corresponding points accurately match with each other, and obtain an image with a deep depth of field by composition.

BRIEF DESCRIPTION OF DRAWINGS

FIG. 1A is a schematic view illustrating a configuration of an image capturing apparatus including an image processing device according to an embodiment of the invention.

FIG. 2 is a flowchart of image processing according to the embodiment of the invention.

FIG. 3 is a view illustrating three images which are captured while changing a focus position.

FIG. 4 is a view in which feature point extraction images are set from four images.

FIG. 5 is a view in which feature point extraction images are set from five or seven images.

FIG. 6 is a view in which feature point extraction images art set from six images.

FIG. 16 is a view illustrating a distance between feature points or corresponding points.

FIG. 22 is a view illustrating three images which are captured while changing a focus position.

DESCRIPTION OF EMBODIMENTS

First Embodiment

Figure 1B:
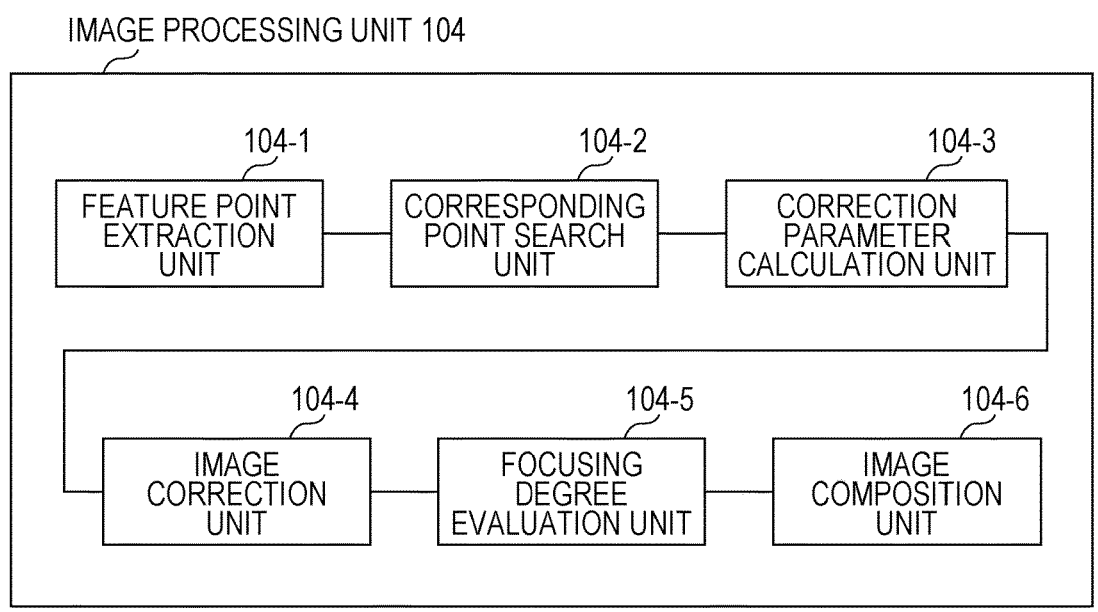
FIG. 1B is a functional block diagram illustrating one configuration example of the image processing device according to the embodiment of the invention.

Hereinafter, embodiments of the invention will be described with reference to drawings. FIG. 1A is a schematic view illustrating a configuration of an image capturing apparatus 10 including an image processing device (image processing unit 104) according to the present embodiment.

The image capturing apparatus 10 is configured to include a control device 100, an image capturing unit 101, and an image display unit 102.

The control device 100 is configured to include a control unit 103, the image processing unit 104, and a storage device 105.

The image capturing unit 101 is configured to include an image capturing device such as a CCD (Charge Coupled Device), a lens, a lens driving unit, and the like.

The image display unit 102 displays an image indicated by an output image signal which is output from the control device 100. The image display unit 102 is a liquid crystal display, for example. The image display unit 102 may include a touch panel function. A touch panel is a device which senses a touch on a picture or a region which is displayed on a display screen and outputs the touch as an information signal to the outside. There are touch panels of a resistive film type which senses a voltage of an operated position, a capacitance type which catches a change in a capacitance between a fingertip and a conductive film and thereby detects a position, and the like, and an action which corresponds to positional information and an operation on the screen by an operator is performed.

The control unit 103 performs control of a drive of the lens (not illustrated) of the image capturing unit 101, reception of an input signal from input devices (not illustrated) such as a power button and a shutter button, image display on the image display unit 102, and the like. The control unit 103 is realized by execution of a program by hardware such as a CPU (Central Processing Unit) or a GPU (Graphics Processing Unit) which is included in the image capturing apparatus 10.

As illustrated in FIG. 1A(b), the control unit 103 has a focus control unit 103-1, an object selection reception unit 103-2, and an image capturing control unit 103-3. The image processing unit 104 analyzes sharpness or the like with respect to a plurality of input images that are input and performs composition to obtain one image based on an analysis result. Further, the image processing unit 104 may be realized by hardware such as an ASIC (Application Specific Integrated Circuit) or an FPGA (Field Programmable Gate Array), for example.

FIG. 2 illustrates a flow of image processing that an image with a deep depth of field is obtained by compositing a plurality of images which are captured at different focus positions. The plurality of images which are captured by the image capturing unit 101 at different focus positions are input to the image processing unit 104 (S201). Next, an image for feature point extraction is set from the plurality of images and a feature point is extracted (S202). After the feature point is extracted, corresponding points which correspond to the feature point extracted at S202 are searched for from images other than the image from which the feature point has been extracted (S203). After the corresponding points are searched for, a rotation amount, a translation amount, or an enlargement or reduction ratio in accordance with a change in the focus position between the plurality of images is calculated from a positional relation of the feature point and the corresponding points, and a correction parameter with which the corresponding positions between the plurality of images are matched (S204). After the correction parameter is calculated, so that, with an image serving as a reference at a time of composition, the other images are matched, the other images are corrected (S205). After correction is performed so that the corresponding positions in the respective images are matched, focusing degrees of the respective images are evaluated (S206). Then, by selecting a pixel value of an image in focus for each region of the images based on the focusing degrees of the respective images for composition, an image with an expanded depth of field is generated (S207). Note that, for S201 to S207, the image capturing unit 101, a feature point extraction unit 104-1, a corresponding point search unit 104-2, a correction parameter calculation unit 104-3, an image correction unit 104-4, a focusing degree evaluation unit 104-5, and an image composition unit 104-6 may be provided as functional units as illustrated in FIG. 1B.

Next, each step of the flowchart illustrated in FIG. 2 will be described in detail.

At S201, a plurality of images are captured at different focus positions. When the focus positions of the respective images are set to have intervals such that an object positioned between adjacent focus positions is not greatly blurred, in image composition at S207 described below, it is possible to obtain a preferable image with an expanded depth of field without a region having an unnatural blur. In addition, by allowing a user to designate a focus position, it is possible to attain a following effect. For example, when a preview screen of a scene to be captured is displayed on a display screen provided in the image capturing apparatus, a user is allowed to select an object existing in the closest view, and focus positions of other images are determined with a position of the selected object as a reference, it is possible to obtain an image with an expanded depth of field, in which the close view is captured clearly without exception, by composition. Moreover, the user may be allowed to select an object which is desired to be captured the most clearly. When, based on positional information of the object selected by the user, setting focus positions so that the selected object is in focus at least in one image, it is possible to obtain an image with an expanded depth of field, in which the object that the user desires to capture the most clearly is captured clearly, by composition. In addition, a focus position of one image may be determined with an autofocus function. When, based on information of the focus position calculated by the autofocus function, setting focus positions so that at least one image is captured at the focus position calculated by the autofocus function, it is possible to obtain an image with an expanded depth of field, in which an object which is in focus with an ordinary autofocus is captured clearly, by composition. In the case of setting focus positions based on the information of focus of the autofocus function, an operation by the user at a time of image capturing is to be an operation similar to that of a case where one image is captured by using the ordinary autofocus function, so that a burden on the user is small. Further, by setting a moving method of focus positions to be in the same direction at a time of capturing a plurality of images while changing the focus position, a following effect is attained. In feature point extraction and corresponding point search at S202 and S203 described below, in the case of searching for a corresponding point corresponding to a feature point, the search is easier when a degree of similarity between the plurality of images is high. In the case of performing image capturing while changing the focus position in the same direction, since an image capturing interval between images whose focus positions are adjacent is short, deviation of positions of an object is small, thus making it possible to search for the corresponding point with high accuracy.

Next, a method of feature point extraction and a method of corresponding point search at S202 and S203 will be described. At S202, an image from which a feature point is extracted is set first. Hereinafter, an image from which a feature point is extracted is referred to as a "feature point extraction image". In addition, an image in which a point corresponding to the feature point of the feature point extraction image is searched for is referred to as a "corresponding point search image". FIG. 3 illustrates three images which are captured while changing a focus position. FIG. 3(A), FIG. 3(B), and FIG. 3(C) illustrate images captured with an object 301 (person) in a close view, an object 302 (building) in a middle view, and an object 303

(mountain) in a distant view in focus, respectively. In the case of performing positional alignment of the three images of FIGS. 3(A), (B), and (C), it is preferable to set FIG. 3(B) as a feature point extraction image. At a time of searching for a corresponding point in a corresponding point search image at S203 after feature point extraction, it is easier to search for the corresponding point when a degree of similarity of two images to be compared is higher. This is because, as illustrated in FIG. 3, when comparing images captured at different focus positions, images whose blurs are different are to be compared, and, when comparing images whose blurs are greatly different, a degree of similarity between the images is low and search for a corresponding point becomes difficult. When setting FIG. 3(B) as the feature point extraction image, blurs of FIG. 3(A) and FIG. 3(B) are not greatly different and blurs of FIG. 3(C) and FIG. 3(B) are not greatly different as well, so that it is possible to accurately calculate each of a positional relation of FIG. 3(A) and FIG. 3(B) and a positional relation of FIG. 3(B) and FIG. 3(C), to accurately calculate a positional relation of the three images from each of the positional relations, and to accurately perform positional alignment of the three images. On the other hand, in a case where FIG. 3(A) or FIG. 3(C) is set as the feature point extraction image, when comparing FIG. 3(A) and FIG. 3(C), the blurs of the two images are greatly different, so that highly accurate search for the corresponding point becomes difficult. Accordingly, FIG. 3(B) is the most preferable as the feature point extraction image among FIGS. 3(A), (B), and (C). That is, in the case of three images, it is preferable to set an image, whose focus position is in the middle and in which an object in a middle view is in focus, as the feature point extraction image.

Next, a method of setting feature point extraction images in a case where there are four images will be described. FIG. 4 illustrates four images which are captured at different focus positions, and images 401, 402, 403, and 404 are arrayed in order of a focus position of each image from a side of a close view. In the case of performing positional alignment of four images, when setting only one image as a feature point extraction image, at a time of performing corresponding point search at S203, at least one of three images other than the feature point extraction image is to be an image captured at a focus position which is greatly different from a focus position of the feature point extraction image, so that the corresponding point search becomes difficult. Then, in the case of four images, two images are set as feature point extraction images. Though there are six ways of selection in the case of selecting two images from four images, since, in the case of any of combinations of 401 and 402, 401 and 404, and 403 and 404, images which are not the feature point extraction images are to consecutively exist among the images which are arrayed in order of focus positions, there is an image in which corresponding point search becomes difficult. Therefore, the feature point extraction images are set so that images which are not the feature point extraction images do not consecutively exist among the images which are arrayed in order of focus positions. FIGS. 4(A), (B), and (C) illustrate a case where the feature point extraction images are set so that images among the four images, which are not the feature point extraction images, do not consecutively exist, and illustrate that images indicated in gray are the feature point extraction images and images indicated in white are images other than the feature point extraction images.

By setting the feature point extraction images as illustrated in FIGS. 4(A), (B), and (C), it is possible to obtain each positional relation between images whose focus positions are adjacent (401 and 402, 402 and 403, or 403 and 404) with at least one image as the feature point extraction image, thus making it possible to accurately search for a corresponding point. Furthermore, among three methods of setting feature point extraction images illustrated in FIG. 4, the method of FIG. 4(C) allows more preferable corresponding point search. Since the image 401 is an image captured with the closest view in focus, an object in a distant view is captured being greatly blurred, and since the image 404 is an image captured with the most distant view in focus, an object in a close view is captured being greatly blurred, so that each of the image 401 and the image 404 is more likely to include therein a greatly blurred region. Accordingly, in the case of setting the image 401 or the image 404 as the feature point extraction image, there is a high possibility that, when extracting a feature point by a method of feature point extraction described below, there is a region in which the feature point is unable to be extracted. On the other hand, since the image 402 and the image 403 are images each of which is captured with a middle view in focus, blurs of the object in the close view and the object in the distant view which are not in focus are not so great, and a possibility that there is a region in which a feature point is unable to be extracted is low compared to the image 401 and the image 404, so that the image 402 and the image 403 are suitable as the feature point extraction images. That is, the method of setting the feature point extraction images of FIG. 4(C) in which neither the image 401 nor the image 404 is set as the feature point extraction image is the most preferable. In other words, in the case of four images, it is preferable to set two images, whose focus positions are in the middle and in which objects in middle views are in focus, as the feature point extraction images.

Next, a method of setting feature point extraction images in a case where there are five or more images will be described. In a case where the number of images is N, N/2 (integer: rounding down decimal places) images are set as feature point extraction images. For example, in the case of five images, two images are set, in the case of six images, three images are set, in the case of seven images, three images are set, and in the case of eight images, four images are set as the feature point extraction images. FIG. 5(A) illustrates a method of setting feature point extraction images in a case where there are five images, and FIG. 5(B) illustrates a method of setting feature point extraction images in a case where there are seven images. In each figure, an image 502, an image 504, an image 507, an image 509, and an image 511 which are indicated in gray are set as the feature point extraction images. As illustrated in FIG. 5, in a case where the number of images is an odd number, by setting, as the feature point extraction images, 2×i-th (i is a positive integer which is equal to or less than N/2) images when N images are arrayed in order of focus positions, it is possible to set the feature point extraction images so that images which are not the feature point extraction images do not consecutively exist.

In FIG. 5, though an image 503, an image 508, and an image 510 are images which are captured at focus positions suitable for feature point extraction images, when setting the feature point extraction images so that the image 503, the image 508, and the image 510 are included in the feature point extraction images and images which are not the feature point extraction images do not consecutively exist, in the case of five images, three images are to be set, and in the case of seven images, four or more images are to be set as the feature point extraction images, resulting in that the number of feature point extraction images is increased compared to the case where only 2×i-th images are set as the feature point extraction images. When the number of feature point extraction images is increased, a processing amount required for feature point extraction is increased, so that the method that 2×i-th images are set as feature point extraction images is preferable in terms of the small processing amount. FIG. 6 illustrates a method of setting feature point extraction images in a case where there are six images. In the case of six images, by setting three images as feature point extraction images, it is possible to set the feature point extraction images so that images which are not the feature point extraction images do not consecutively exist.

FIG. 6 illustrates the method of setting three feature point extraction images, and there are four ways of FIGS. 6(A), (B), (C), and (D). In any of them, images which are not the feature point extraction images do not consecutively exist, and it is possible to accurately search for corresponding points in corresponding point search at S203 described below. Further, among FIGS. 6(A) to (D), FIGS. 6(C) and (D) illustrate more preferable methods of selecting feature point extraction images. In FIGS. 6(C) and (D), neither an image 601 nor an image 606 is included in the feature point extraction images. Since the image 601 is an image captured with the closest view in focus, an object in a distant view is captured being greatly blurred, and since the image 606 is an image captured with the most distant view in focus, an object in a close view is captured being greatly blurred, so that each of the image 601 and the image 606 is more likely to include therein a greatly blurred region. Accordingly, in the case of setting the image 601 or the image 606 as the feature point extraction image, there is a high possibility that, when extracting a feature point by the method of feature point extraction described below, there is a region in which the feature point is unable to be extracted. Thus, FIGS. 6(C) and (D) in which neither the image 601 nor the image 606 is included in the feature point extraction images illustrate more preferable methods of setting feature point extraction images.

As described above, in a case where N (N is an integer equal to or more than 3) images are arrayed in order of focus positions, 1) by setting N/2 images as feature point extraction images so that images which are not the feature point extraction images do not consecutively exist, highly accurate corresponding point search becomes possible. Further, 2) by setting the feature point extraction images from N−2 images excluding an image captured with the most distant view in focus and an image captured with the closest view in focus, it becomes possible to perform more preferable feature point extraction, so that highly accurate corresponding point search becomes possible. Note that, 3) a method of setting feature point extraction images which satisfies the aforementioned conditions is decided as one way in a case where N is an odd number, and 2×i-th (i is a positive integer equal to or less than N/2) images are to be set as the feature point extraction images. On the other hand, in a case where N is an even number, as illustrated in FIG. 4 and FIG. 6, there are a plurality of methods of setting feature point extraction images.

Figure 7:
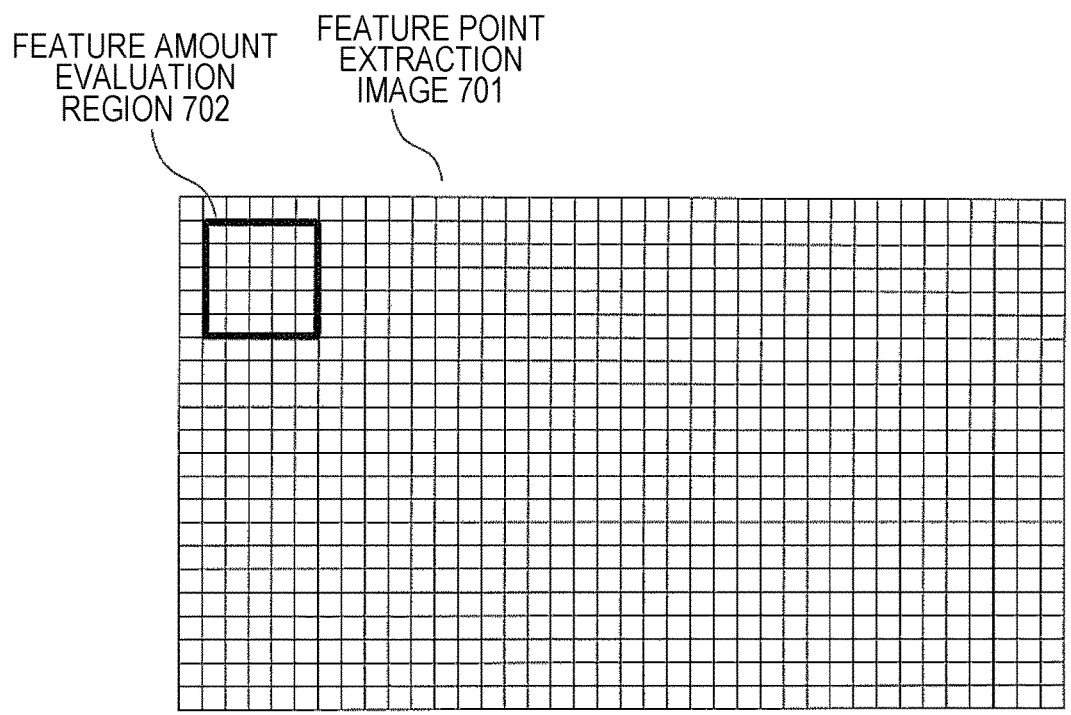
FIG. 7 is a view illustrating a feature point extraction image and a feature amount evaluation region.

Next, the method of feature point extraction at S202 will be described. FIG. 7 illustrates a feature point extraction image 701 and a feature amount evaluation region 702 for searching for a feature point in the image. In order to extract the feature point, while the feature amount evaluation region 702 is moved in the feature point extraction image 701, a feature amount in the feature amount evaluation region 702 at each position is calculated, and whether the position is the feature point which is suitable for corresponding point search is judged based on the calculated feature amount. A size of the feature amount evaluation region may be determined based on a size of the feature point extraction image, for example, as 3% of resolution of the feature point extraction image.

Figure 8:
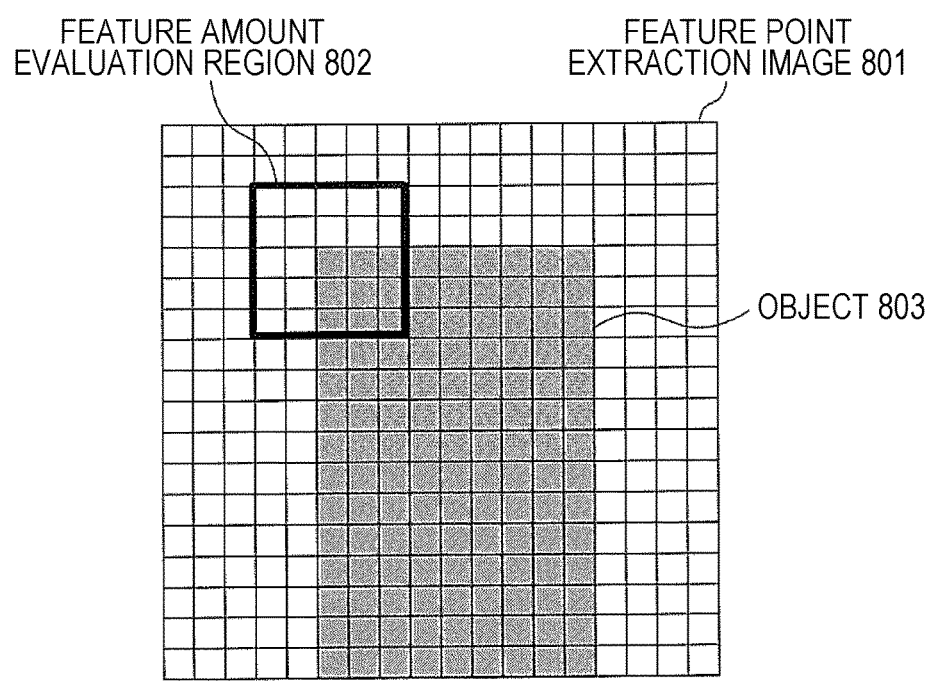
FIG. 8 is a view illustrating a feature point extraction image and a feature amount evaluation region.
Figure 9:
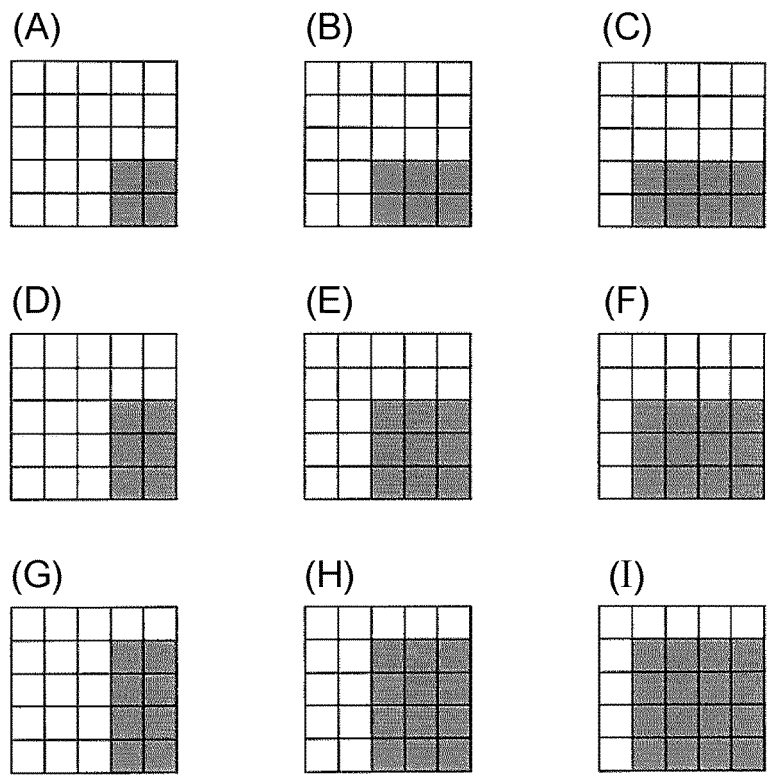
FIG. 9 is a view illustrating a change in distribution of pixel values in a case where a feature amount evaluation region is translated.

In the invention, a shape is evaluated as a feature amount, and a position of a region having a shape suitable for corresponding point search is extracted as a feature point. For example, a corner shape is suitable as the feature point. FIG. 8 illustrates a feature point extraction image 801 and a feature amount evaluation region 802, and a corner is included in the feature amount evaluation region 802. FIG. 9 illustrates distribution of pixel values in the region in each case where the feature amount evaluation region 802 is moved to a position which is translated from a position indicated in FIG. 8 in a longitudinal, lateral, or oblique direction. FIG. 9(E) indicates a position of the feature amount evaluation region 802 of FIG. 8. As illustrated in FIG. 9, in a case where a corner is included in the feature amount evaluation region, when the position of the feature amount evaluation region is translated, the distribution of pixel values in the region significantly changes when the position is translated in any direction. Accordingly, when a corresponding point is searched for by setting a position such as 802 as the feature point, one position whose degree of similarity is high is likely to be decided, so that reliable corresponding point search becomes possible. In the case of extracting a corner shape as the feature point, it is possible to evaluate the feature amount evaluation region by a known corner detection method such as Moravec corner detection or Harris corner detection and to perform extraction. Moreover, similarly to the corner shape, a shape such as a T-shape, a cross shape, or a tip end of an edge is also suitable as a feature point since distribution of pixel values in a region significantly changes when a position thereof is translated in each direction. Note that, in a case where resolution of an image is high, resolution of a feature amount evaluation region also becomes relatively high, and a processing amount is increased, so that it is possible to reduce the processing amount by reducing the image according to the resolution of the image and extracting a feature point on the reduced image.

Next, corresponding point search at S203 will be described. As a method of searching for corresponding positions between a plurality of images, a block matching method is cited, for example. The block matching method is a method of evaluating a degree of similarity between images, and a method of selecting a certain region from one image and selecting a region having the highest degree of similarity to the certain region from the image to be compared. Various evaluation functions are used for evaluation of the degree of similarity. Examples thereof include a method of selecting a region whose sum of absolute values of difference in pixel values or luminance values of two images is the minimum as a region having the highest degree of similarity, which is called SAD (Sum of Absolute Difference).

Figure 10:
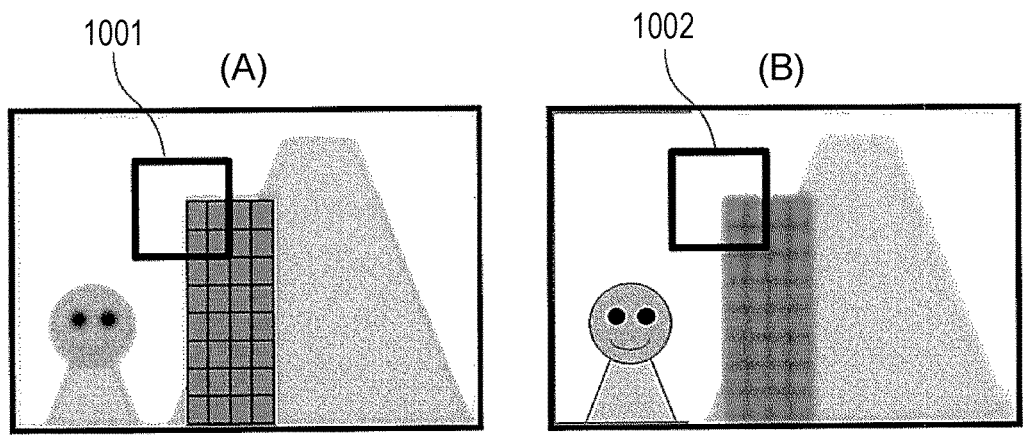
FIG. 10 is a view illustrating a feature point extraction image and a corresponding point search image.

FIG. 10(A) illustrates a feature point extraction image and FIG. 10(B) illustrates a corresponding point search image, and a region 1001 in FIG. 10(A) is selected as a feature point. When searching for a corresponding point, it is necessary to set a search range properly. In a case where a view angle changes in accordance with a change in a focus position, a plurality of images are captured while being enlarged or reduced in a radial direction with the center of each image as the center. Accordingly, when a focus position of each image is known, a direction of a movement of a corresponding point, which results from the change in the focus position, is known from a relation of a focus position of an image to be compared, so that it is possible to set a search range with the direction of the movement taken into consideration.

Figure 11:
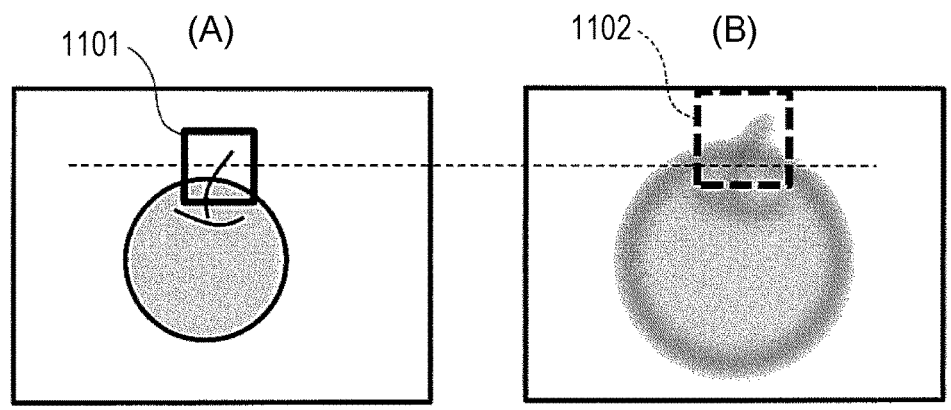
FIG. 11 is a view illustrating a corresponding point search range with a change in a view angle taken into consideration.

For example, FIG. 11(A) illustrates a feature point extraction image and FIG. 11(B) illustrates a corresponding point search image, and 1101 denotes a region indicating a position of a feature point. Since FIG. 11(B) is captured while being enlarged compared to FIG. 11(A), a point corresponding to 1101, which is positioned in an upper part of the image, is captured in a further upper part of the image in FIG. 11(B). Therefore, it is more preferable to set a corresponding point search range for 1101 so that an upper side from the center of 1101 is larger like a region 1102 in FIG. 11(B), which is surrounded by a broken line. Further, in a case where image capturing is performed without fixing the image capturing apparatus, such as a case where a user performs image capturing by holding the image capturing apparatus in his or her hand, in addition to the change in the view angle in accordance with the change in the focus position, a movement of a corresponding point occurs in accordance with a movement of a position of image capturing such as translation or rotation, so that it is necessary to set a corresponding point search range by taking an influence thereof into consideration.

As described above, in the case of searching for corresponding points between a plurality of images captured while changing focus, since there is a possibility that enlargement, reduction, rotation, or translation occurs in accordance with the change in focus, a corresponding point search region may be set with an influence thereof taken into consideration. Further, also at the time of extracting a feature point at S202, enlargement, reduction, rotation, or translation between images needs to be considered. When selecting a feature point from an extreme edge of a screen, there is a possibility that a point corresponding to the feature point is out of view angles of other images and does not exist on the images. Thus, it is preferable to extract a feature point from a region excluding edges of a screen at S202. In addition, it is possible to further improve reliability by using a result of corresponding point search. For example, in the case of evaluation by SAD as the above-described block matching method, it is considered that a position whose SAD value is the minimum is a corresponding point having the highest degree of similarity to the feature point, but, in a case where a region having a repeating pattern is extracted as the feature point, there is a possibility that SAD values include a plurality of minimal values, and that, when two minimal values are near values, a corresponding point can be erroneously selected.

Moreover, also in the case of extracting, as a feature point, a region in which a change in distribution of pixel values is small even when a feature amount evaluation region is translated in a certain direction, there is a possibility that there are a plurality of values close to the minimum value of the SAD values, so that a corresponding point can be erroneously selected. Then, in a case where there are a plurality of minimal values having close values, or in a case where there are a plurality of values close to the minimum value, reliability is considered to be low, and thus the feature point and the corresponding point are not to be used for correction parameter calculation described below, and a different feature point and corresponding point which are reliable are used, thus making it possible to perform accurate positional alignment. As pixel values used for SAD, RGB values of images may be used. Moreover, among the RGB values, by using that of one color representatively, it is possible to reduce a processing amount compared to the case of using three colors of RGB. In addition, images are in a YUV format, a Y value may be used. By using the Y value, it is possible to reduce a processing amount compared to the case of using the three colors of RGB. Further, the Y value may be calculated from the RGB values. The calculation of the Y values from the RGB values may be performed by a following formula, for example.

$$Y=0.299 \times R+0.587 \times G+0.114 \times B$$

Note that, as to a block size in a case where corresponding point search is performed by the block matching method, the block size of corresponding point search may be set so as to include a region of the feature amount evaluation region set at S202 in order to search for a corresponding point of the feature point extracted at S202. For example, in the case of setting the feature amount evaluation region to be 3% of resolution of an image at S202, the block size of corresponding point search may be set to be 10% of resolution of an image. When resolution of an image is high, resolution at a time of corresponding point search becomes relatively high, so that a processing amount is increased. Then, By reducing the image according to the resolution of the image, searching for a corresponding point on the reduced image, and, based on a position of the corresponding point calculated on the reduced image, performing corresponding point search on the original image, it is possible to set a search range at the time of corresponding point search on the original image, for which a processing amount is large, to be small, thus making it possible to reduce the processing amount.

Next, description will be given for feature point extraction with correction parameter calculation at S204 taken into consideration. Causes of deviation occurring between images captured while changing focus include enlargement or reduction in accordance with a change in a view angle and a movement of the image capturing apparatus such as translation (an X direction, a Y direction, or a Z direction) or rotation (yawing, pitching, or rolling). When the image capturing apparatus does not move, deviation in accordance with translation or rotation does not occur, but enlargement or reduction in accordance with a change in the view angle always occurs. Accordingly, in order to accurately calculate a parameter with which an enlargement ratio is corrected, it is necessary to extract at least a feature point suitable for calculation of a deviation amount resulting from enlargement or reduction and to search for a corresponding point thereof. For the calculation of a deviation amount resulting from enlargement or reduction, a point which is distant from the center of a screen is more suitable. For example, when an image is captured while being enlarged by 1%, a position which is 10 pixels distant from the center of the screen is captured at a position of 10.1 pixels. On the other hand, when the image is captured while being enlarged by 1%, a position which is 1000 pixels distant from the center of the screen is captured at a position of 1010 pixels. Though both positions are captured while being enlarged by 1%, as to the position which is 10 pixels distant from the center of the screen, it is necessary to search for a corresponding point with 0.1 pixel accuracy in order to calculate the deviation amount resulting from enlargement or reduction.

Figure 12:
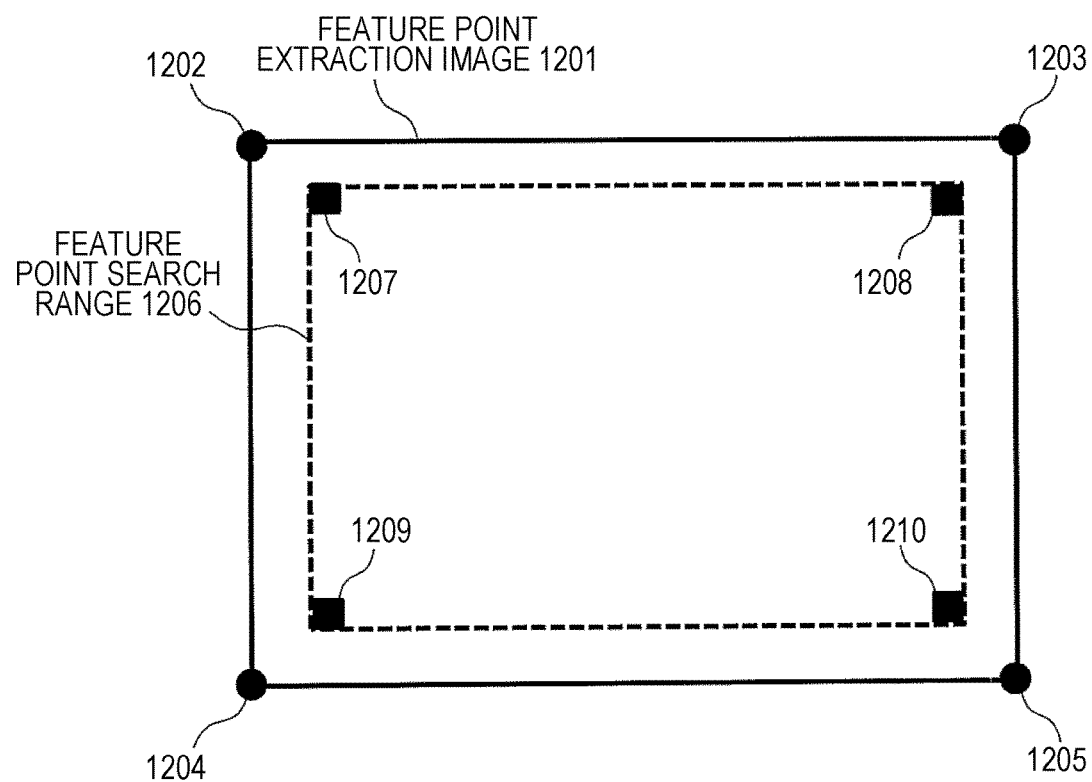
FIG. 12 is a view illustrating a corresponding point search range.

It is not easy to correctly search for a corresponding point with 0.1 pixel accuracy with the above-described block matching method, and it is difficult to correctly search for a corresponding point with 0.1 pixel accuracy in comparison of images each of which has a different focus position and different blur. On the other hand, since deviation of 10 pixels, which results from enlargement or reduction, occurs at the position which is 1000 pixels distant from the center of the screen, a corresponding point merely may be searched for with 1 pixel accuracy. Thus, a point which is distant from the center of the screen is more suitable for the feature point extracted at S202. As to the method of feature point extraction at S202, for example, by extracting feature points which are respectively the closest to four corners of the screen, it is possible to calculate an accurate enlargement ratio. However, when extracting a feature point from an extreme edge of the screen, there is a possibility that a point corresponding to the feature point is out of view angles of other images, so that the feature points which are respectively the closest to four corners of the screen may be extracted in a region excluding edges of the screen. FIG. 12 illustrates a feature point extraction image 1201, points at four corners 1202, 1203, 1204, and 1205, and a feature point search range 1206 which is surrounded by a broken line.

Figure 13:
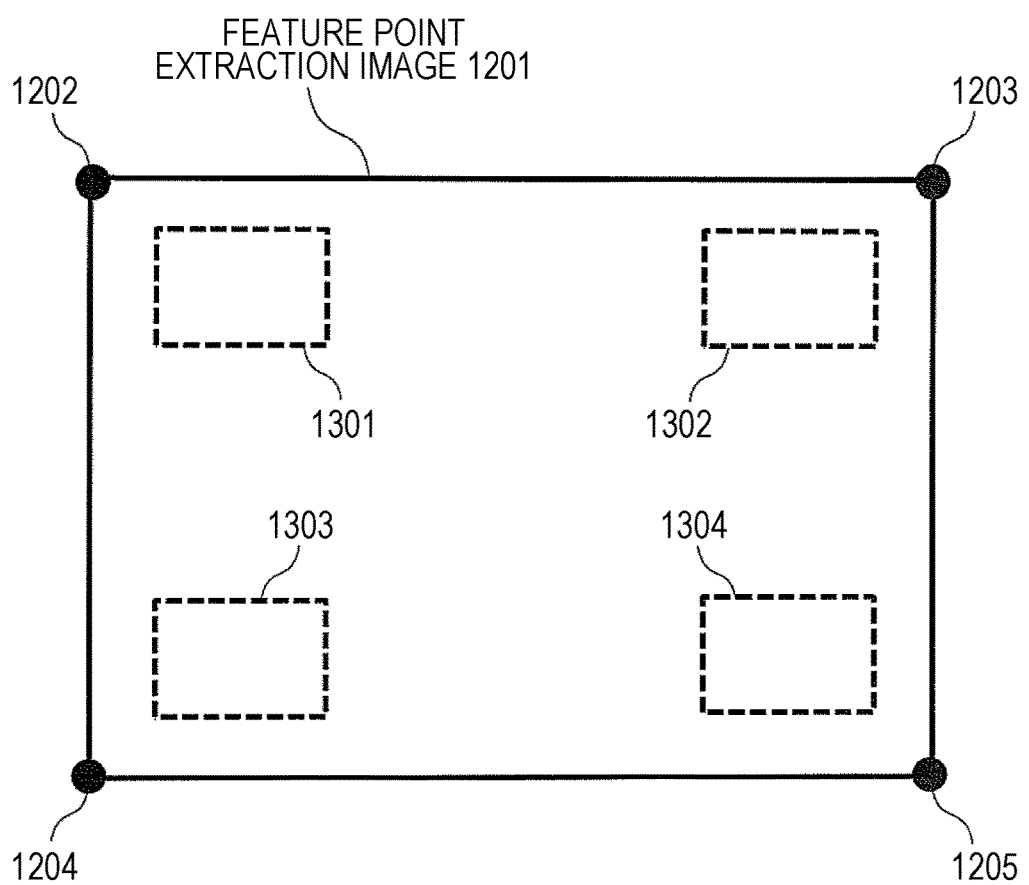
FIG. 13 is a view illustrating one example in which corresponding point search ranges are limited.

A search order in the case of extracting feature points which are respectively the closest to the four corners of the screen will be described next. As one search order, there is an order that raster scanning is performed from the upper left to the lower right on the screen, but it takes time to reach a lower part of the screen, so that there is a possibility that processing requires time. Then, search for the feature points which are respectively the closest to the four corners is respectively performed from different starting positions and in different directions of search. In FIG. 12, as to search for the feature point which is the closest to the point 1202, the search is performed in a direction from the upper left to the lower right with a point 1207 as the starting position. Similarly, as to the point 1203, search is performed in a direction from the upper right to the lower left with a point 1208 as the starting position, as to the point 1204, search is performed in a direction from the lower left to the upper right with a position 1209 as the starting position, and as to the point 1205, search is performed in a direction from the lower right to the upper left with a point 1210 as the starting position. When search is performed with the above-described method, search is able to be started from the point close to each of the four corners, so that there is a high possibility that the target feature points are able to be extracted at an early stage of search, thus making it possible to reduce a processing amount. In addition, as a method of further reducing the processing amount, there is a method of limiting a search range. For example, FIG. 13 illustrates a view in which ranges where the feature points which are respectively the closest to the points 1202 to 1205 at the four corners in FIG. 12 are searched for are respectively limited to regions 1301, 1302, 1303, and 1304. As illustrated in FIG. 13, by limiting the search range, an effect of reducing the processing amount is attained.

However, when each search region is set to be small as illustrated in FIG. 13, though the processing amount is reduced, a possibility that there is no feature point in the region is increased. In a scene where a plurality of images are captured while changing focus, there is a high possibility that objects whose distances from a camera are greatly different exist together, and there is a high possibility that an object which is not in focus is included in each of the images captured while changing focus. For example, in the image of FIG. 3(A), a right side of the image has a blur entirely, and it is difficult to extract a feature point such as a corner shape from such a region. In addition, in a case where an object having no feature such as blue sky is captured, it is difficult to extract a feature point even when focus is on. Thus, it is more preferable to set a feature point search region to be large.

Figure 14:
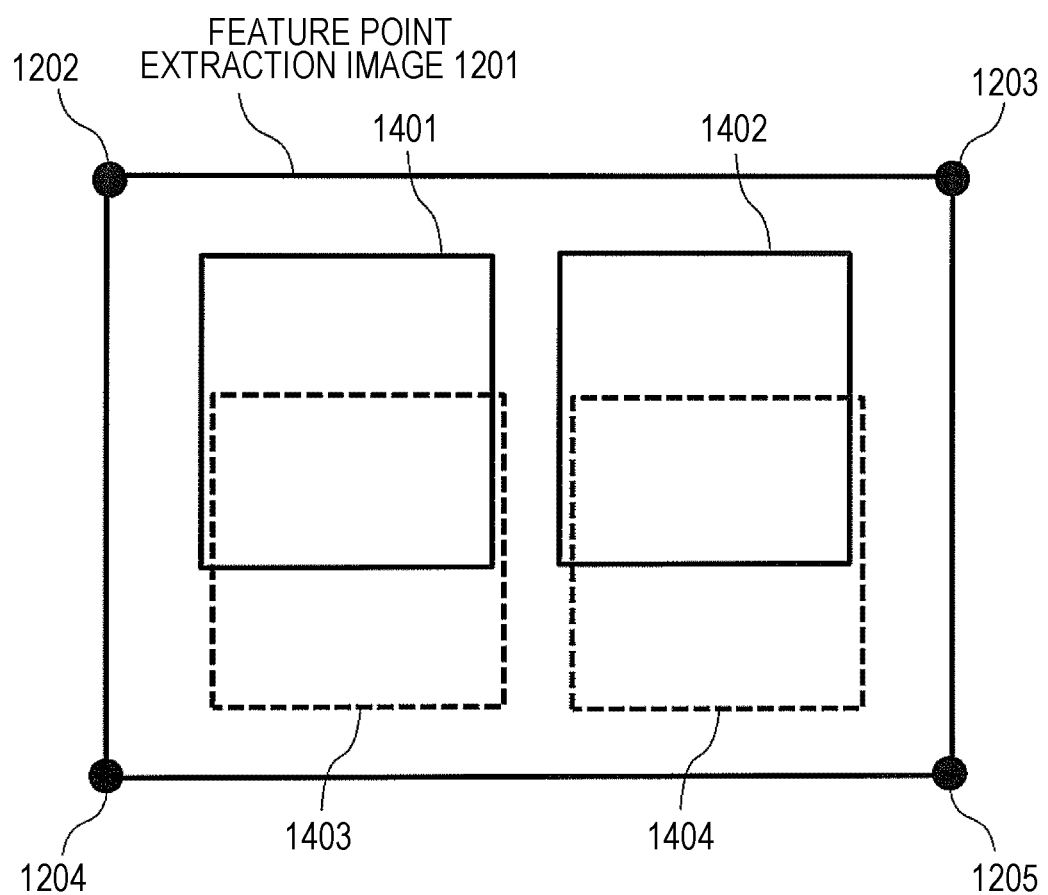
FIG. 14 is a view illustrating a setting example of corresponding point search ranges.

FIG. 14 is a view illustrating one example of a method of setting feature point search regions. A feature point search region which is the closest to the point 1202 is set as a region 1401, and similarly, a feature point which is the closest to the point 1203 is searched for from a region 1402, a feature point which is the closest to the point 1204 is searched for from a region 1403, and a feature point which is the closest to the point 1205 is searched for from a region 1404. A reason why none of the four search regions includes a center part of the screen in FIG. 14 is because a feature point in the center of the screen is not suitable for calculation of an enlargement ratio. Moreover, in FIG. 14, the region 1401 and the region 1403, and the region 1402 and the region 1404 partially overlap with each other. By setting the respective search regions to be substantially large, it is possible to reduce a possibility that a feature point is unable to be extracted. In addition, since search is performed from the positions, which are respectively close to the four corners, in the respective regions even in the case of setting the regions to be large, when the feature points are extracted at an early stage of the search, a processing amount is reduced, and even in a case where the feature points are not near the four corners, the processing amount is not increased since corresponding point search is not performed until the feature points are extracted.

As described above, by extracting the feature points which are respectively close to the four corners of the image, it is possible to accurately calculate an enlargement ratio. Moreover, positions of the feature points to be extracted are less likely to exist in a part of the image unevenly, so that it is possible to calculate, in image correction at S205 described below, a parameter which allows correction that deviation of an entire of the image is reduced. In addition, in the case of setting the feature point search regions to be large in an overlapping manner, when there is a region having a blur or a region having no feature point, such as a flat region, in the image, there is a possibility that unevenness occurs in positions of the feature points to be extracted. However, since the feature points are extracted from regions in focus, by performing image correction described below with a correction parameter calculated from the feature points, the regions in focus are accurately corrected. As to a region from which a feature point is not extracted, correction accuracy is likely to be deteriorated, but there is a low possibility that insufficient correction accuracy causes deterioration in an image quality for the region having no feature in an image composition described below.

Thus, it can be said that the feature points which are respectively close to the four corners of the image, which are extracted by setting the feature point search regions to be large, are feature points suitable for image correction. In a case where there is no feature point in the set feature point search region, the correction parameter may be calculated only from an extracted feature point. This is because, as described above, correction accuracy required at a time of image composition is low in a region having no feature compared to a region having a feature.

Figure 15:
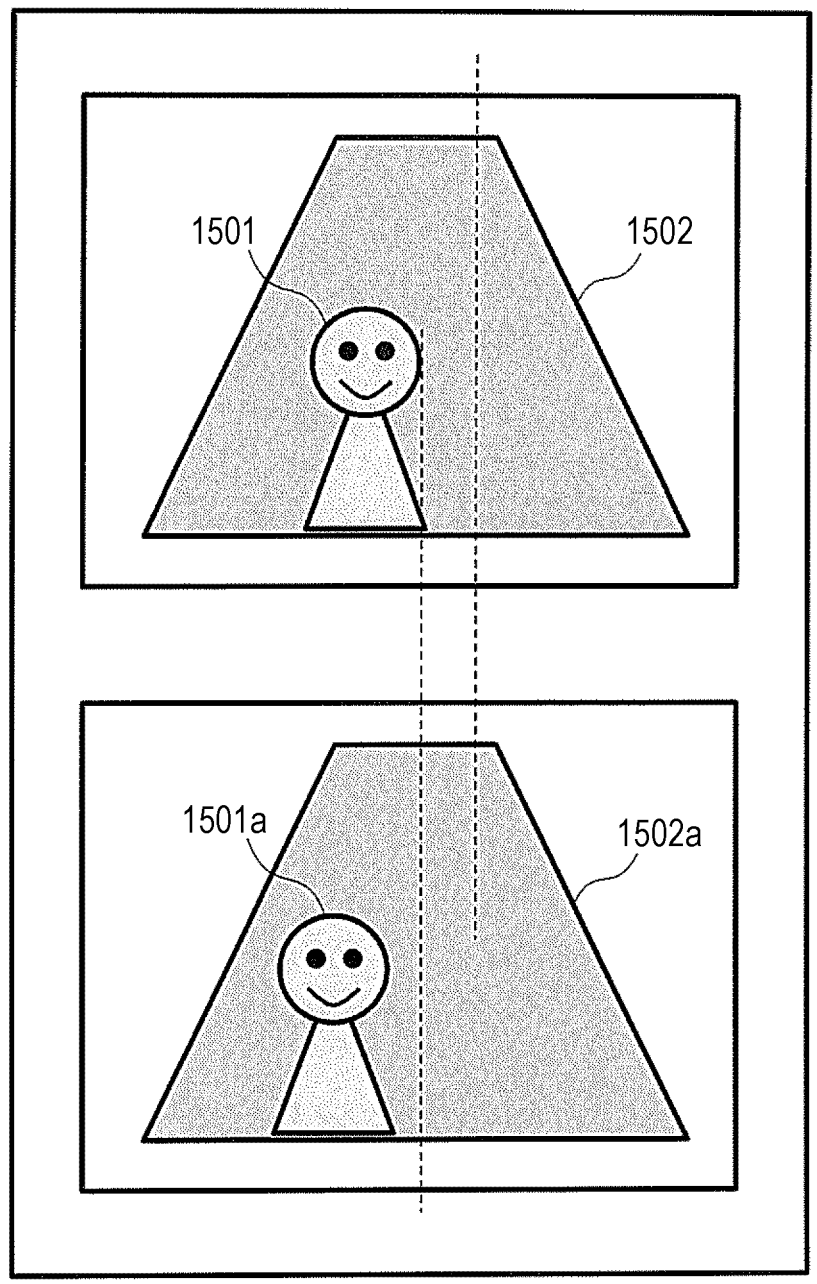
FIG. 15 is a view illustrating deviation of positions of an object due to a movement of an image capturing apparatus.

Next, an influence of translation or rotation will be described. In a case where the image capturing apparatus rotates (rolls), though a change amount of a region which is close to the center of the rotation is small, a change amount of a region which is distant from the center of the rotation is large. Accordingly, also in a case where a deviation amount resulting from rotation is calculated, similarly to enlargement or reduction, it can be said that a point which is distant from the center part of the screen is more suitable for correction parameter calculation. Further, in a case where the image capturing apparatus rotates (pitches or yaws) or in the case of translation (the X direction, the Y direction, or the Z direction), a deviation amount varies according to a distance to an object. For example, an upper figure and a lower figure in FIG. 15 illustrate two images which are captured while the image capturing apparatus is translated, and an object 1501 in a close view and an object 1502 in a distant view are captured therein. When comparing the upper figure and the lower figure in FIG. 15, positions of the object 1501 (1501a) in the close view are deviated, but positions of the object 1502 (1502a) in the distant view are not deviated. This difference is caused because distances from the image capturing apparatus to each of the two objects are different. Thus, in a case where the image capturing apparatus moves, since a deviation amount changes according to a distance to an object, when correcting an entire of an image with one correction parameter, a region which does not coincide is to be generated.

In FIG. 15, when the object 1501 accurately coincides, deviation of the object 1502 becomes great, and when the object 1502 accurately coincides, deviation of the object 1501 becomes great. By individually calculating a correction amount at each position in an image, it is possible to perform accurate correction at all positions, but a processing amount is increased. Then, in order to realize accurate correction in a case where an image is corrected with one correction parameter, a correction parameter with which deviation of all feature points does not become great may be calculated by extracting feature points from the image without unevenness. For example, by calculating a correction parameter with which a sum of deviation between positions of the feature points and positions of corresponding points after correction becomes the minimum, it is possible to make deviation of the entire of the image small. In addition, a correction parameter with which a sum of the squares of deviation between the positions of the feature points and the positions of the corresponding points after correction becomes the minimum may be calculated.

Next, a method of calculating a correction parameter at S204 and a method of image correction at S205 will be described. As described above, in the case where the image capturing apparatus moves, since a deviation amount varies according to a distance to an object, it is difficult to perform correction with one correction parameter without deviation. However, in a case where a moving amount of the image capturing apparatus is not large, it is possible to accurately perform correction by enlarging or reducing, rotating, or translating the entire of the image with one parameter. First, among an enlargement ratio, a rotation amount, and a translation amount, the enlargement ratio is obtained. Since a distance between two points does not change even when rotation or translation is performed in an image, the enlargement ratio is not affected by the rotation or the translation. Thus, it is possible to obtain the enlargement ratio from distances between feature points (or corresponding points) of respective images.

FIG. 16(A) illustrates a feature point extraction image 1601 and extracted feature points 1602, 1603, 1604, and 1605, and FIG. 16(B) illustrates a corresponding point search image 1606 and corresponding points 1607, 1608, 1609, and 1610 which correspond to the feature points 1602 to 1605, respectively. An enlargement ratio thereof is able to be calculated from a ratio of distances between two points. For example, when it is set that coordinates of the point 1602 are (X1, Y1), and coordinates of the point 1603 are (X2, Y2), a distance D1 between the two points is $$D1=((X1-X2)^2+(Y1-Y2)^2)^{0.5}.$$

Similarly, when it is set that coordinates of the point 1607 are (X3, Y3), and coordinates of the point 1608 are (X4, Y4), a distance D2 between the two points is $$D2=((X3-X4)^2+(Y3-Y4)^2)^{0.5},$$

and an enlargement ratio S1 of the image 1606 with respect to the image 1601 is $$S1=D2/D1.$$

When the center of enlargement or reduction is the center of the images, coordinates of a corresponding point after correction, for example, coordinates of the point 1607 after correction (X3', Y3') are $$X3'=X3/S1$$

$$Y3'=Y3/S1.$$

By correcting the enlargement ratio, distances between the feature points or the corresponding points of the respective images after correction become almost equal, and, for example, a distance D2' (not illustrated) between the point 1607 and the point 1608 after correction of the enlargement ratio becomes almost equal to the distance D1 between the point 1602 and the point 1603.

As described above, an influence due to a movement of the image capturing apparatus varies according to a position (distance to an object) of each feature point, and there is a possibility that an enlargement ratio to be calculated varies according to a selected feature point (corresponding point) in such a manner that, when performing corresponding point search with 1 pixel accuracy, there is a possibility that an error of 1 pixel or less occurs, for example. Then, by calculating respective enlargement ratios from different combinations of two feature points (corresponding points) and averaging the resultants, it is possible to calculate an enlargement ratio with which deviation does not become great at any feature point (corresponding point). Moreover, by rearranging the plurality of calculated enlargement ratios in ascending order or descending order and averaging the enlargement ratios excluding the maximum value and the minimum value, even in a case where an enlargement ratio which is deviated greatly is calculated, it is possible to perform calculation by excluding a value thereof. Further, in a case where a distance between feature points (corresponding points) is short, a deviation amount of positions between images in accordance with enlargement or reduction is small, and, depending on accuracy of corresponding point search, there is a possibility that an error of a calculated enlargement ratio becomes great, so that, by using a ratio of distances between two feature points, which have a long distance therebetween, for calculation of an enlargement ratio without using two feature points, which have a short distance therebetween, for the calculation of the enlargement ratio, it is possible to improve accuracy of the calculation.

Figure 17:
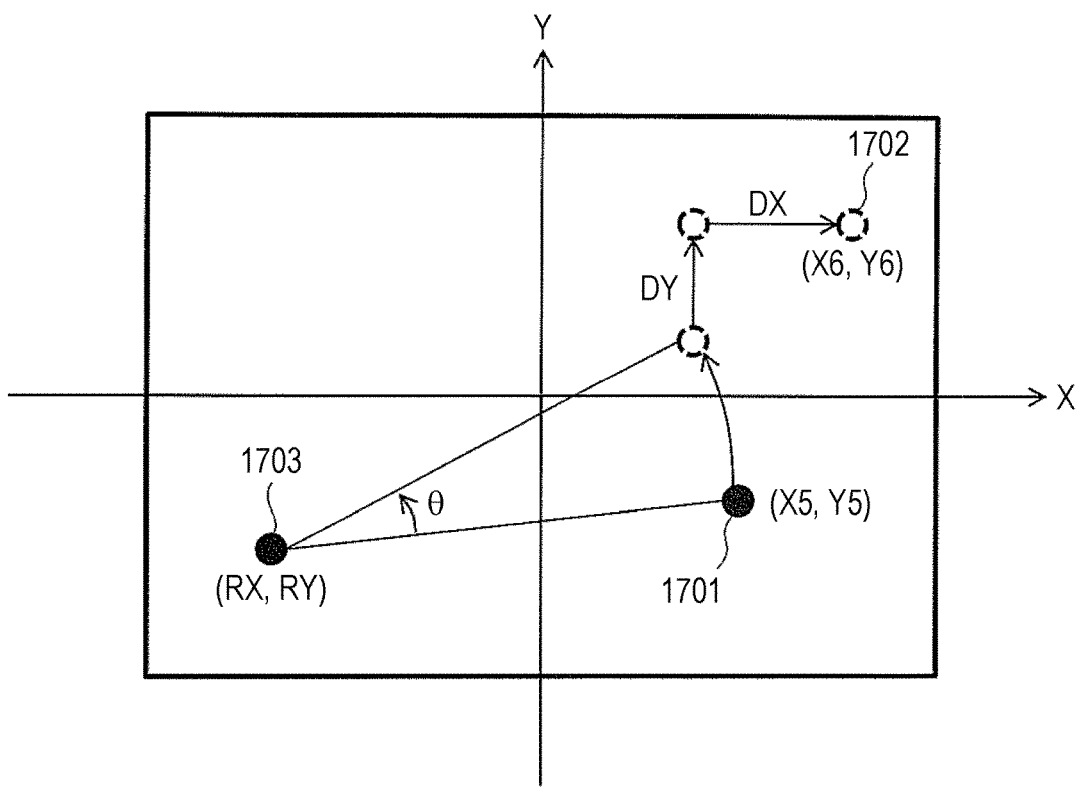
FIG. 17 is a view illustrating correction (rotation and translation) of a corresponding point whose enlargement ratio is corrected.

Next, a method of calculating a rotation amount and a translation amount will be described. The rotation amount and the translation amount are calculated from a positional relation of a feature point and a corresponding point whose enlargement ratio has been corrected. FIG. 17 illustrates a corresponding point 1701 (X5, Y5) whose enlargement ratio has been corrected and a corresponding point 1702 (X6, Y6) after correction obtained by rotating the point 1701 by an angle θ with a rotation center 1703 (RX, RY) as the center and further performing translation by DX in an X-axis direction and by DY in a Y-axis direction. A relation of coordinates of the point 1701 and the point 1702 is $$X6=(X5-RX)\times\cos\theta-(Y5-RY)\times\sin\theta+RX+DX, \text{ and}$$

$$Y6=(X5-RX)\times\sin\theta+(Y5-RY)\times\cos\theta+RY+DY.$$

Figure 18:
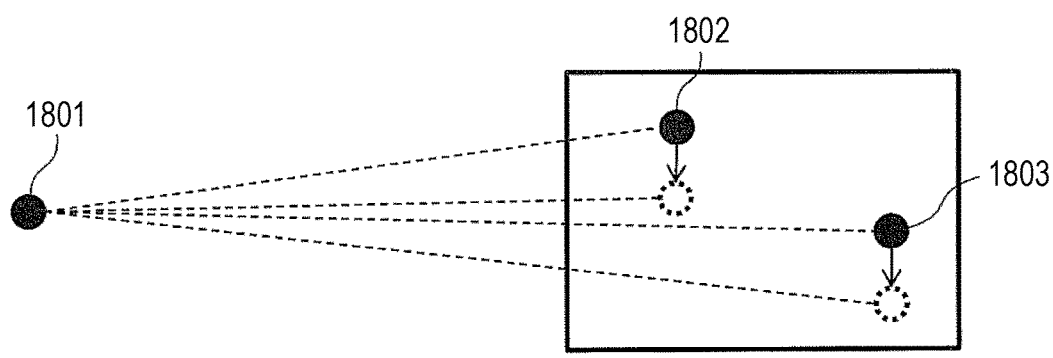
FIG. 18 is a view illustrating deviation of positions of an object due to rotation of an image capturing apparatus.

A correction parameter with which deviation of positions of the coordinates of the corresponding point, which are corrected by the aforementioned formulas, and the coordinates of the feature point becomes small is determined. In addition, by calculating the rotation amount and the translation amount by setting the rotation center in the center of images, it is possible to reduce a calculation amount. For example, in a case where a rotation center is positioned at a point 1801 in a left side which is sufficiently distant from an image as illustrated in FIG. 18, when a rotation direction is clockwise, points 1802 and 1803 on the image almost similarly move downward on the image. When setting the rotation center in the center of the image for this movement, the movement of the points 1802 and 1803 illustrated in FIG. 18 becomes equivalent to downward translation without rotation. That is, even without calculating the rotation center precisely, by calculating the rotation amount and the translation amount by setting the rotation center in the center of the image, it is possible to perform correction accurately. When setting the rotation center in the center of the image, coordinates of the corresponding point after correction is $$X6=X5\times\cos\theta-Y5\times\sin\theta+DX$$

$$Y6=X5\times\sin\theta+Y5\times\cos\theta+DY,$$

so that the calculation becomes easier. Since correction is performed not only for the corresponding point but also for the entire of the image in image correction described below, by calculating a correction amount by setting the rotation center in the center of the image, it is possible to attain an effect of reduction in a processing amount. Note that, in a case where a deviation amount of a feature point and a corresponding point after correction is extremely large, it is considered that accuracy of positional alignment is low, and there is a high possibility that an image quality of a composited image is deteriorated. Then, in a case where a deviation amount of a feature point and a corresponding point after correction is larger than a predetermined value, any of photographed images may be saved without image composition. Moreover, a user may be notified that there is a high possibility that deterioration in an image quality occurs, and the user may be allowed to select whether or not to perform composition processing.

Figure 19:
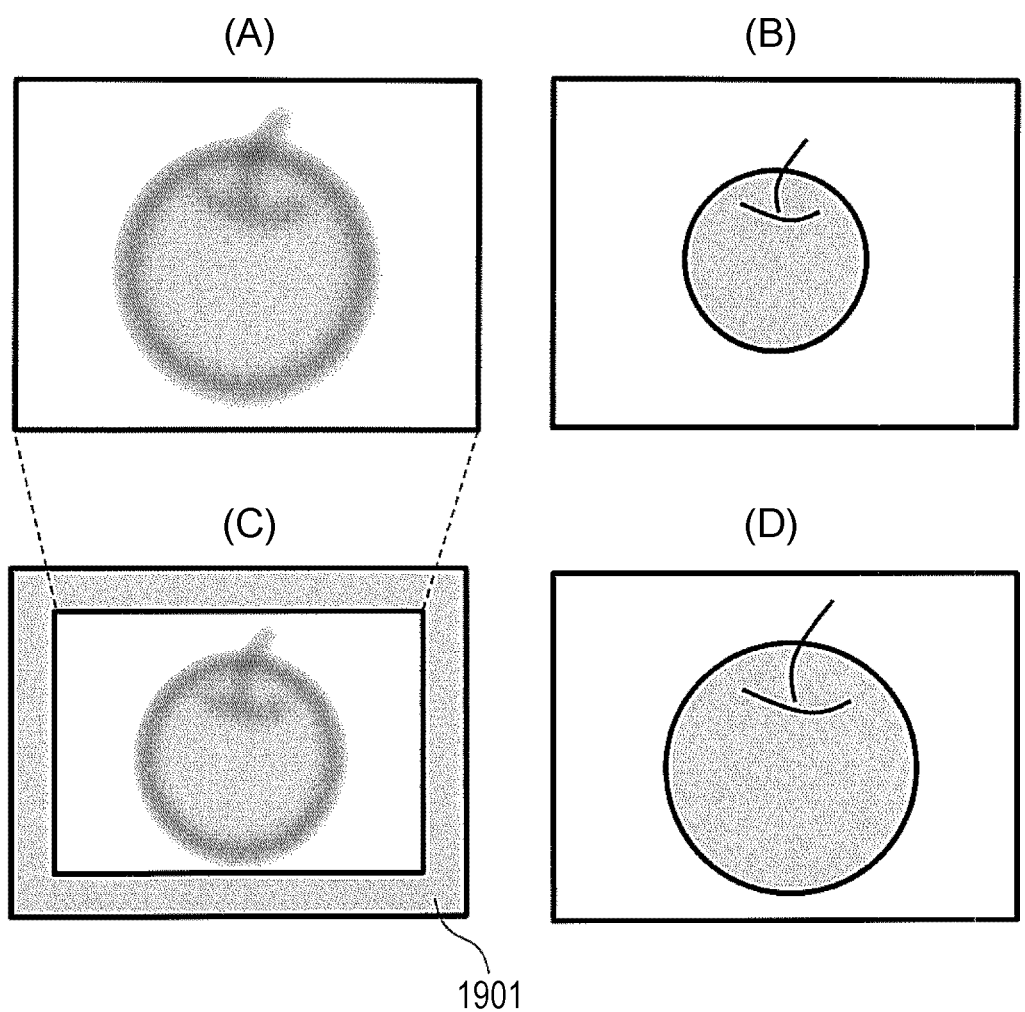
FIG. 19 is a view illustrating deviation of an object due to a change in a view angle.

By using the correction parameter calculated with the method above, correction is performed so that all images coincide with each other. For the correction of the images, with an image whose view angle is the smallest as a reference, the other images are corrected. Hereinafter, an image serving as the reference at a time of correcting images in order to perform composition by using a plurality of images is referred to as a correction base image. FIGS. 19(A) and (B) illustrate two images which are captured while changing focus, and, in A, a view angle is smaller, that is, an object is captured so as to be larger. In FIG. 19, when being corrected with B, whose view angle is large, as a reference, A becomes like what FIG. 19(C) illustrates, and a region 1901 in edges of the image, which is indicated in gray, is out of the view angle of A, so that only information of the image B is obtained at the time of composition. On the other hand, when being corrected with A, whose view angle is small, as the reference, B becomes like what FIG. 19(D) illustrates, and it is possible to obtain information of both of the images A and B over a whole of the images. Therefore, in the case of performing positional alignment of images whose view angles are different, with an image whose view angle is the smallest as a reference, the other images may be corrected. When it is assumed that the closer view the focus is on, the smaller the view angle becomes, as a correction base image, the image 401 may be set in the case of FIG. 4, the image 501 and the image 506 may be set in the case of FIG. 5, and the image 601 may be set in the case of FIG. 6. As described above, since a relation of a feature point and a corresponding point is obtained by calculation as to adjacent images, there is a possibility that there is also an image for which a correction parameter with respect to the correction base image is not calculated directly, but a correction amount between adjacent images is known, so that it is possible to calculate correction amounts of all images with respect to the correction base image based on the relation therebetween.

Next, a method of focusing degree evaluation at S206 will be described. A focusing degree is able to be evaluated with a contrast of an image. The contrast is able to be calculated from a difference in pixel values between adjacent pixels in a predetermined region having a target pixel as the center thereof. When focus is not on and an image has a blur, a difference in pixel values of adjacent pixels becomes small by being averaged by the blur, so that it is possible to judge that the greater a difference in pixel values of adjacent pixels is, the more focus is on. As pixel values used for the calculation of the contrast, RGB values may be used, for example. Moreover, among the RGB values, by using that of only one color, it is possible to reduce a processing amount. In addition, by using a Y value, it is possible to reduce the processing amount compared to the case of using three colors of RGB. Further, when the values which have been used at the time of the above-described corresponding point search are used again, it is not necessary to newly perform calculation, and thus it is preferable. A size of a region where a contrast is calculated in respective pixels may be set as, for example, 1% of a size of an image. It is preferable to set the region, in which a contrast is calculated, to be large to some extent for pixel selection at a time of image composition described below.

Figure 20:
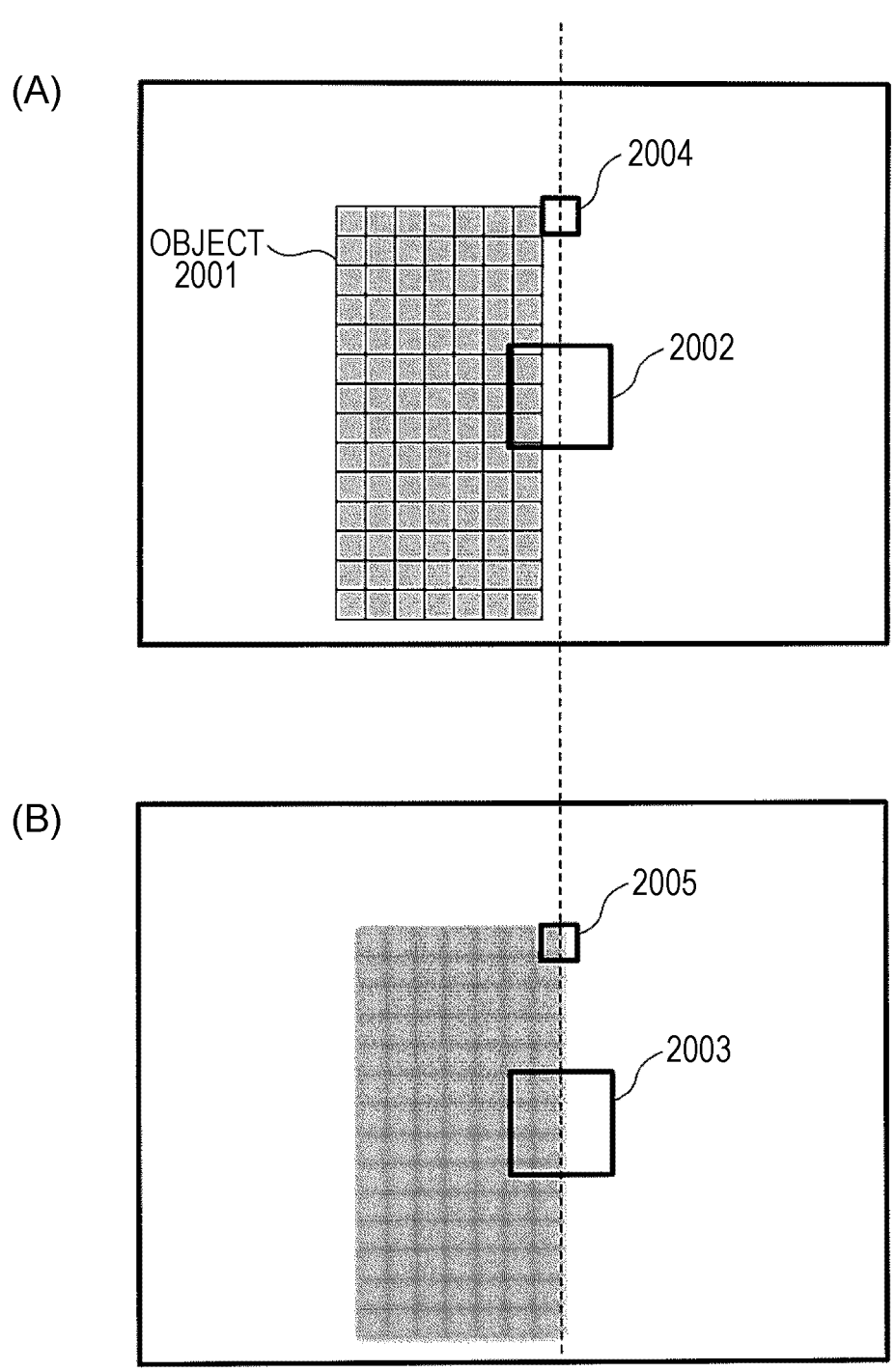
FIG. 20 is a view illustrating contrast calculation regions whose focusing degrees are evaluated.

FIG. 20(A) illustrates a correction base image, and FIG. 20(B) illustrates an image corrected so as to coincide with FIG. 20(A), and an image A is captured with an object 2001 in focus, and an image B is captured with the object 2001 not in focus, and slight positional deviation occurs as to the object 2001 between the two images. In addition, regions 2002, 2003, 2004, and 2005 indicate contrast calculation regions. Comparing the regions 2002 and 2003, 2002 includes a region having a higher contrast, so that the image A is more likely to be selected at a time of image composition. On the other hand, comparing the regions 2004 and 2005, since the region 2004 is a flat region, a contrast in the region 2005 becomes higher, so that the image B is more likely to be selected at the time of image composition. Since, on the correction base image, the region 2004 is a region in which there is no object, when the region 2005 is selected, deterioration in an image quality such as a double image can be caused, so that it is preferable to set the contrast calculation region to be large to some extent as the regions 2002 and 2003, because it is possible to reduce a possibility of deterioration in an image quality of a composited image even when accuracy of image correction is low as in FIG. 20. Note that, regarding focusing degree evaluation at S206, description has been given for procedure that evaluation is performed for the correction base image and an image corrected so as to coincide with the correction base image, but contrasts of photographed images before correction may be calculated and the calculated contrasts may be corrected by using a correction parameter of the images.

Next, image composition at S207 will be described. At S207, composition is performed by selecting pixels of an image, whose focusing degree is the highest, in respective positions of images based on the focusing degree of each of the images, which is calculated at S206, and thereby an image with a deep depth of field is obtained by the composition. As to a flat region such as blue sky, contrasts are small in images captured at any focus position, and there is no difference in the contrasts between the images. For such a region, pixel values of the correction base image may be selected, or the plurality of images may be averaged. By performing averaging, an effect of reducing noise is attained. In addition, depending on a position of an object, there may be a region in which contrasts of the plurality of images are almost equal.

Figure 21:
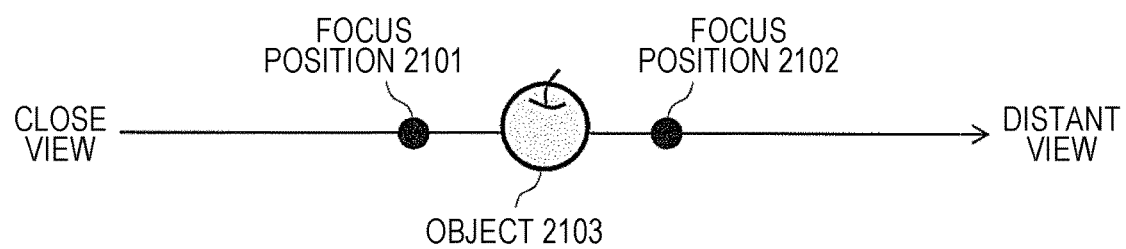
FIG. 21 is a view illustrating a relation of focus positions and a position of an object.

FIG. 21 illustrates focus positions 2101 and 2102 of two images and an object 2103 positioned therebetween. The object 2103 is captured being slightly blurred in an image captured at the focus position 2101, and is captured being slightly blurred also in an image captured at the focus position 2102, and a difference between the two images becomes small. In a case where contrasts of a plurality of images are almost equal as illustrated in FIG. 21, calculation may be performed by averaging pixel values of a composited image. Moreover, in a case where contrasts of the plurality of images are near, the pixel values of the composited image may be calculated by performing weighting based on each amount of contrast.

As described above, according to the present embodiment, an image with a deep depth of field is able to be obtained by composition, by setting N/2 images as feature point extraction images so that, in a case where N images captured at different focus positions are arrayed in order of focus positions, at least one of two adjacent images becomes a feature point extraction image; searching for points corresponding to a feature point, extracted from the feature point extraction image, from the other images; calculating a correction parameter, with which corresponding positions of the N images are matched, from a positional relation of the feature point and the corresponding points; with an image whose view angle is the smallest among the N images as a reference, correcting the other images; calculating a focusing degree of each of the images whose corresponding points are matched; and performing composition by selecting pixels of an image whose focusing degree is high.

Second Embodiment

A second embodiment of the invention will be described next. In the second embodiment, images to be used for image composition are selected based on correction accuracy of the images.

Though a correction parameter is calculated at S204 so that a feature point extracted at S202 and corresponding points searched for at S203 are matched, there is a low possibility that all of a plurality of sets of a feature point and corresponding points are matched without deviation. However, as described above, since pixel values of an image whose contrast is high are selected by the image composition unit at S207, in the case of small deviation, an image quality of a composited image is less likely to be deteriorated. Then, a threshold related to a deviation amount of a feature point and a corresponding point is set, and only images a deviation amount of each of which is equal to or less than the threshold are used for composition. For example, in a case where an object moved during photography, a case where a user greatly moved a position of the image capturing apparatus during photography, or the like, there is a possibility that accurate correction is able to be performed by using images midway through capturing. In such a case, for example, in a case where deviation amounts of three images among five images, which have smaller view angles, are small, only the first, second, and third images are used for image composition.

That is, based on a result of positional alignment by the image correction unit 104-4, the image composition unit 104-6 excludes an image whose accuracy of positional alignment is low from N images, and selects or weighted averages pixels of an image whose focusing degree is high from images whose accuracy of positional alignment is high, and thereby obtain an image with a deep depth of field by composition.

With the aforementioned configuration, even in a case where an image having a large deviation amount is included in a plurality of images captured while changing focus, by performing composition by using only images each of which has a small deviation amount, it is possible to obtain a composited image whose depth of field is expanded compared to the respective captured images.

Third Embodiment

A third embodiment of the invention will be described next. In the third embodiment, images to be used for image composition are selected based on information of focus positions of the images.

At S204, an enlargement ratio of each image is calculated. In the case of an image capturing apparatus whose view angle changes according to a focus position, when image capturing is performed while changing the focus position, an enlargement ratio of each image changes. Accordingly, when there are images having the same enlargement ratio although image capturing is performed while changing the focus position, it is considered that the images are images captured at almost the same focus positions. A depth of field is not able to be expanded by compositing images captured at the same focus position, and, in a case where deviation occurs in image correction, a risk of deterioration of an image quality is caused at a time of image composition. Thus, images captured at almost the same focus positions are not used for image composition, and thereby it is possible to reduce the risk of the deterioration of the image quality and generate a preferable composited image.

As the method of obtaining focus positions of respective images, a method of making a judgment from enlargement ratios of the respective images has been described, but the judgment may be made based on focus control information of the image capturing apparatus. With the aforementioned configuration, even in a case where a plurality of images whose focus positions are near are included in a plurality of images captured while changing focus, by performing composition by using only images captured at focus positions which are distant from each other at appropriate intervals, it is possible to obtain a composited image whose depth of field is expanded compared to the respective captured images. In addition, since composition processing is performed only with the necessary number of images, it is possible to reduce a processing amount compared to the case of using all images.

That is, in a case where a plurality of images captured at substantially the same focus positions are included in N images, the image composition unit 104-6 selects or weighted averages pixels of an image whose focusing degree is high from images from which at least one of the images captured at substantially the same focus positions is excluded, and thereby obtains an image with a deep depth of field by composition.

According to the present embodiment, it is possible to correct a plurality of images captured at different focus positions so that corresponding points are accurately matched, and obtain an image with a deep depth of field by composition.

The processing and the control are able to be realized by software processing by a CPU (Central Processing Unit) or a GPU (graphics Processing Unit) or by hardware processing by an ASIC (Application Specific Integrated Circuit) or an FPGA (Field Programmable Gate Array).

In the aforementioned embodiments, the configurations and the like illustrated in the attached drawings are not limited thereto, and may be modified as appropriate within the scope where the effects of the invention may be obtained. Additionally, the invention is able to be practiced with appropriate modifications without departing from the scope of objects of the invention.

Moreover, any selection can be made optionally from each component of the invention, and an invention which includes the selected configuration is also included in the invention.

Further, a program for realizing functions which have been described in the embodiments may be recorded in a computer-readable recording medium, the program which is recorded in the recording medium may be read and executed by a computer system, and processing of each unit may thereby be performed. Note that, the "computer system" herein includes an OS and hardware such as peripheral equipment.

In addition, the "computer system" includes a homepage providing environment (or display environment) in a case where the WWW system is used.

(Additional Notes)

The invention includes following disclosure.

(1)

An image processing device which performs positional alignment of N (N is an integer equal to or more than 3) images captured at different focus positions, including:

a feature point extraction unit which extracts a feature point from the N images;

a corresponding point search unit which searches for corresponding points, which correspond to the feature point, between the N images; and an image correction unit which performs positional alignment between the N images based on a positional relation of the feature point and the corresponding points, in which N/2 (an integer obtained by rounding down decimal places) images among the N images are set as feature point extraction images from each of which the feature point is extracted, at least one of two adjacent images among the N images in order of focus positions is set as one of the feature point extraction images, and the image correction unit corrects, with an image a view angle of which is smallest among the N images as a reference, the other images.

Thereby, an image with a deep depth of field is able to be obtained by composition, by setting N/2 images as the feature point extraction images so that, in a case where the N images captured at different focus positions are arrayed in order of focus positions, at least one of two adjacent images becomes the feature point extraction image; searching for corresponding points corresponding to the feature point, extracted from the feature point extraction image, from the other images; calculating a correction parameter, with which corresponding positions of the N images are matched, from the positional relation of the feature point and the corresponding points; with the image the view angle of which is the smallest among the N images as the reference, correcting the other images; calculating focusing degrees of the respective images whose feature point and corresponding points are matched; and performing composition by selecting pixels of an image whose focusing degree is high.

(2)

The image processing device according to (1), in which the N/2 feature point extraction images are set from N−2 images obtained by excluding two images of an image captured at a focus position in a closest view side and an image captured at a focus position in a most distant view side from the N images.

Blurs of an object in a close view and an object in a distant view, which are not in focus, are not so great, and a possibility that there is a region in which the feature point is unable to be extracted is low, so that the N−2 images are suitable for the feature point extraction images.

(3)

The image processing device according to (1) or (2), in which the feature point extraction unit extracts the feature point from a region excluding edges of the image and a center of the image of the feature point extraction image, and extracts feature points which are respectively close to four corners of the feature point extraction image.

Since a large amount of information related to calculation of a correction amount is able to be obtained compared to a point in the center of the image, the aforementioned region is suitable for the feature point. Moreover, since deviation in accordance with a change in a view angle is great, points respectively close to the four corners are suitable for calculation of an enlargement ratio. In addition, it is possible to start search from the points close to respective points of the four corners, so that a possibility that target feature points are able to be extracted at an early stage of search is increased, thus making it possible to reduce a processing amount.

(4)

The image processing device according to any one of (1) to (3), further including an image composition unit which performs composition by selecting or weighted averaging pixels of an image a focusing degree of which is high from the N images which are subjected to the positional alignment by the image correction unit, and thereby obtains an image with a deep depth of field by composition, in which the image composition unit performs composition by excluding an image, accuracy of positional alignment of which is low, based on the positional relation of the feature point and the corresponding points.

Even in a case where an image having a large deviation amount is included in the plurality of images captured while changing focus, by performing composition by using only images each of which has a small deviation amount, it is possible to obtain a composited image in which there is a little deterioration in an image quality resulting from the deviation and whose depth of field is expanded compared to the respective captured images.

(5)

The image processing device according to any one of (1) to (3), further including an image composition unit which performs composition by selecting or weighted averaging pixels of an image a focusing degree of which is high from the N images which are subjected to the positional alignment by the image correction unit, and thereby obtains an image with a deep depth of field by composition, in which in a case where a plurality of images captured at substantially same focus positions are included in the N images, the image composition unit performs composition by excluding at least one of the images captured at substantially the same focus positions.

Even in the case where a plurality of images captured at substantially the same focus positions are included, it is possible to reduce a risk of deterioration in an image quality resulting from deviation, and obtain, by composition, an image with a deep depth of field from the plurality of images captured at different focus positions.

(6)

The image processing device according to (3), in which the image correction unit, by calculating respective enlargement ratios from different combinations of two feature points and averaging the resultants, calculates an enlargement ratio with which deviation does not become great at any feature point (corresponding point).

An influence due to a movement of the image capturing apparatus varies according to a position (distance to an object) of each feature point, and it is possible to cope with a case where an enlargement ratio to be calculated varies according to a selected feature point (corresponding point) in such a manner that, when performing corresponding point search with 1 pixel accuracy, there is a possibility that an error of 1 pixel or less occurs, for example.

(7)

The image processing device according to (3), in which the image correction unit, by rearranging a plurality of calculated enlargement ratios in ascending order or descending order and averaging enlargement ratios excluding a maximum value and a minimum value, in a case where an enlargement ratio which is deviated greatly is calculated, further performs calculation by excluding a value thereof.

(8)

The image processing device according to (3), in which the image correction unit, in a case where a distance between feature points (corresponding points) is short, uses a ratio of distances between two feature points, which have a long distance therebetween, for calculation of an enlargement ratio without using two feature points, which have the short distance therebetween, for the calculation of the enlargement ratio.

A deviation amount of positions between images in accordance with enlargement or reduction is small, and, depending on accuracy of corresponding point search, there is a possibility that an error of a calculated enlargement ratio becomes great, so that it is possible to suppress an influence thereof.

(9)

An image capturing apparatus including the image processing device according to any one of (1) to (8).

(10)

An image processing method of performing positional alignment of N (N is an integer equal to or more than 3) images captured at different focus positions, including:

a feature point extraction step of extracting a feature point from the N images;

a corresponding point search step of searching for corresponding points, which correspond to the feature point, between the N images; and an image correction step of performing positional alignment between the N images based on a positional relation of the feature point and the corresponding points, in which N/2 (an integer obtained by rounding down decimal places) images among the N images are set as feature point extraction images from each of which the feature point is extracted, at least one of two adjacent images among the N images in order of focus positions is set as one of the feature point extraction images, and at the image correction step, with an image a view angle of which is smallest among the N images as a reference, the other images are corrected.

INDUSTRIAL APPLICABILITY

The invention is usable for an image processing device.

REFERENCE SIGNS LIST

10 image capturing apparatus
100 control device
101 image capturing unit
102 image display unit
103 control unit
104 image processing unit
104-1 feature point extraction unit
104-2 corresponding point search unit
104-3 correction parameter calculation unit
104-4 image correction unit
104-5 focusing degree evaluation unit
104-6 image composition unit
105 storage device
103-1 focus control unit
103-2 object selection reception unit
103-3 image capturing control unit All publications, patents and patent applications cited in this specification are incorporated herein by reference in their entirety.

The invention claimed is:

1. An image processing device which performs positional alignment of N images captured at different focus positions, wherein N is an integer equal to or more than 3, comprising:
   feature point extraction circuitry configured to extract feature points from feature point extraction images,
   wherein at least one image in every two adjacent images of the N images in order of focus positions is set as the feature point extraction images,
   wherein N/2 is an integer obtained by rounding down decimal places, and
   wherein the number of the feature point extraction images is equal to N/2;
   corresponding point search circuitry configured to search for corresponding points, which correspond to the feature points of the feature point extraction images from images other than the feature point extraction images among the N images;

image correction circuitry configured to perform positional alignment between the N images based on a positional relation of the feature points and the corresponding points; and the image correction circuitry further configured to correct view angles of the images other than a smallest view angle image among the N images by performing the positional alignment between the N images, with the smallest view angle image among the N images as a reference image, wherein the view angle of each image other than the smallest view angle image among the N images is corrected with respect to a center point of each of the N images being captured; and wherein the smallest view angle image is an image having a focus position in a closest view side.

2. The image processing device according to claim 1, wherein the feature point extraction images are set from N−2 images obtained by excluding two images of an image captured at the focus position in the closest view side and an image captured at the focus position in a most distant view side from the N images.

3. The image processing device according to claim 1, wherein
the feature point extraction circuitry configured to extract the feature points from a region excluding edges of each of the feature point extraction images and a center of each of the feature point extraction images, and extracts the feature points which are respectively close to four corners of each of the feature point extraction images.

4. The image processing device according to claim 1, further comprising
image composition circuitry configured to perform composition by selecting or weighted averaging pixels of an image having a high focusing degree from the N images which are subjected to the positional alignment by the image correction circuitry, and thereby obtains an image with a deep depth of field by composition, wherein
the image composition circuitry performs composition by excluding an image, accuracy of the positional alignment of which is low, based on the positional relation of the feature points and the corresponding points.

5. The image processing device according to claim 1, further comprising
image composition circuitry configured to perform composition by selecting or weighted averaging pixels of an image having a high focusing degree from the N images which are subjected to the positional alignment by the image correction circuitry, and thereby obtains an image with a deep depth of field by composition,
wherein in a case where a plurality of images captured at substantially same focus positions are included in the N images, the image composition circuitry performs composition by excluding at least one of the images captured at substantially the same focus positions.

6. The image processing device according to claim 3, wherein the image correction circuitry, calculates respective enlargement ratios from different combinations of two feature points and averages the resultants.

7. The image processing device according to claim 3, wherein the image correction circuitry, calculates respective enlargement ratios from different combinations of two feature points, rearranges the plurality of calculated enlargement ratios in ascending order or descending order and averages the enlargement ratios excluding a maximum value and a minimum value.

8. The image processing device according to claim 3, wherein the image correction circuitry, calculates respective enlargement ratios from different combinations of two feature points, and uses a ratio of distances between two points of two feature points, which have a long distance therebetween, for calculation of the enlargement ratio without using the ratio of distances between two points of two feature points, which have a short distance therebetween, for the calculation of the enlargement ratio.

9. An image capturing apparatus comprising the image processing device according to claim 1.

10. An image processing method of performing positional alignment of N images captured at different focus positions, wherein N is an integer equal to or more than 3, comprising:
a feature point extraction step of extracting feature points from feature point extraction images,
wherein at least one image in every two adjacent images of the N images in order of focus positions is set as the feature point extraction images,
wherein N/2 is an integer obtained by rounding down decimal places, and
wherein the number of the feature point extraction images is equal to N/2;
a corresponding point search step of searching for corresponding points, which correspond to the feature points of the feature point extraction images from images other than the feature point extraction images among the N images;
an image correction step of performing positional alignment between the N images based on a positional relation of the feature points and the corresponding points; and
at the image correction step, correcting view angles of the images other than a smallest view angle image among the N images by performing the positional alignment between the N images, with the smallest view angle image among the N images as a reference image,
wherein the view angle of each image other than the smaller view angle image among the N images is corrected with respect to a center point of each of the N images being captured; and
wherein the smallest view angle image is an image having a focus position in a closest view side.

* * * * *